United States Patent
Kurasawa et al.

(10) Patent No.: US 11,554,777 B2
(45) Date of Patent: Jan. 17, 2023

(54) TRAVEL SUPPORT SYSTEM, TRAVEL SUPPORT METHOD, AND NON-TRANSITORY COMPUTER-READABLE STORAGE MEDIUM STORING PROGRAM

(71) Applicant: HONDA MOTOR CO., LTD., Tokyo (JP)

(72) Inventors: Yuji Kurasawa, Tokyo (JP); Takuma Noguchi, Tokyo (JP); Keiichi Mizumura, Tokyo (JP); Gakushi Fukuda, Tokyo (JP); Go Nakamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 17/020,767

(22) Filed: Sep. 14, 2020

(65) Prior Publication Data
US 2021/0094541 A1 Apr. 1, 2021

(30) Foreign Application Priority Data
Sep. 30, 2019 (JP) .............................. JP2019-180642

(51) Int. Cl.
*B60W 30/095* (2012.01)
*B60W 50/14* (2020.01)
(Continued)

(52) U.S. Cl.
CPC ........ *B60W 30/0956* (2013.01); *B60W 50/14* (2013.01); *G06V 20/58* (2022.01); *B60W 2554/4041* (2020.02); *B60W 2556/45* (2020.02)

(58) Field of Classification Search
CPC ............. B60W 30/0956; B60W 50/14; B60W 2554/4041; B60W 2556/45; G06V 20/58; (Continued)

(56) References Cited

U.S. PATENT DOCUMENTS

2009/0140081 A1* 6/2009 Turcic ...................... B04B 1/14
494/56
2012/0127309 A1* 5/2012 Lee ........................ G06V 10/25
382/104
(Continued)

FOREIGN PATENT DOCUMENTS

JP 2004-046426 A 2/2004
JP 2006323666 A 11/2006
(Continued)

OTHER PUBLICATIONS

Japanese Office Action for Japanese Patent Application No. 2019-180642 dated Aug. 10, 2021 (partially translated).
(Continued)

*Primary Examiner* — Abby Y Lin
*Assistant Examiner* — Hossam M Abd El Latif
(74) *Attorney, Agent, or Firm* — Thomas | Horstemeyer, LLP

(57) ABSTRACT

A travel support system includes a server configured to support the travel of a vehicle. The server comprises a recognition unit configured to recognize an obstacle on a travel path of the vehicle, an obtainment unit configured to obtain, upon detecting an approaching vehicle which is approaching the obstacle, a blind spot region which occurs due to the obstacle recognized by the recognition unit, and a notification unit configured to notify the approaching vehicle of information of the blind spot region obtained by the obtainment unit. The server is arranged in an apparatus other than the approaching vehicle.

14 Claims, 17 Drawing Sheets

(51) Int. Cl.
*G06V 10/94* (2022.01)
*G06V 20/54* (2022.01)
*G06V 20/58* (2022.01)
*G08G 1/16* (2006.01)

(58) Field of Classification Search
CPC ...... G06V 10/95; G06V 20/54; G06V 20/584; G08G 1/16
USPC .......................................................... 701/45
See application file for complete search history.

(56) References Cited

U.S. PATENT DOCUMENTS

| | | | |
|---|---|---|---|
| 2017/0096102 A1* | 4/2017 | Nallapa | B60Q 9/007 |
| 2019/0269321 A1* | 9/2019 | Murakami | A61B 5/165 |
| 2020/0057897 A1* | 2/2020 | Matsuura | G06V 20/58 |
| 2020/0175863 A1* | 6/2020 | Sakurada | G08G 1/0141 |

FOREIGN PATENT DOCUMENTS

| | | | |
|---|---|---|---|
| JP | 2008-041058 A | | 2/2008 |
| JP | 2008041058 A | * | 2/2008 |
| JP | 2010-079565 A | | 4/2010 |
| JP | 2010079565 A | * | 4/2010 |

OTHER PUBLICATIONS

Chinese Office Action for Chinese Patent Application No. 202010951503.2 dated Sep. 16, 2022 (partially translated).

* cited by examiner

A BLIND SPOT REGION DUE TO AN OBSTACLE WILL BE PRESENT SOON IN THE LEFT DIRECTION!

A BLIND SPOT REGION DUE TO AN OBSTACLE WILL BE PRESENT SOON IN THE LEFT DIRECTION! PLEASE WATCH OUT FOR PEDESTRIANS AND THE LIKE!

TRAVEL SUPPORT SYSTEM, TRAVEL SUPPORT METHOD, AND NON-TRANSITORY COMPUTER-READABLE STORAGE MEDIUM STORING PROGRAM

CROSS-REFERENCE TO RELATED APPLICATION(S)

This application claims priority to and the benefit of Japanese Patent Application No. 2019-180642 filed on Sep. 30, 2019, the entire disclosure of which is incorporated herein by reference.

BACKGROUND OF THE INVENTION

Field of the Invention

The present invention relates to a travel support system for supporting travel, a travel support method, and a non-transitory computer-readable storage medium storing a program.

Description of the Related Art

Japanese Patent Laid-Open No. 2006-323666 discloses a pedestrian dart-out warning system that can detect the presence of a pedestrian near inside a gate of a building and notify, on the one hand, a driver of a vehicle approaching this gate and also notify, on the other hand, the pedestrian near inside the gate of the building detected by the vehicle approaching the gate.

When a vehicle temporarily stopping at the side of the road and the like, a blind spot can suddenly occur in some cases. Even if such a blind spot has suddenly occurred, an occupant of the vehicle needs to be notified of this occurrence.

SUMMARY OF THE INVENTION

The present invention provides a travel support system that notifies an occupant of a vehicle that a blind spot region has been generated while the vehicle is traveling, a travel support method, and a non-transitory computer-readable storage medium storing a program.

The present invention in its first aspect provides, a travel support system that includes a server configured to support the travel of a vehicle, wherein the server comprises a recognition unit configured to recognize an obstacle on a travel path of the vehicle, an obtainment unit configured to obtain, upon detecting an approaching vehicle which is approaching the obstacle, a blind spot region which occurs due to the obstacle recognized by the recognition unit, and a notification unit configured to notify the approaching vehicle of information of the blind spot region obtained by the obtainment unit, and the server is arranged in an apparatus other than the approaching vehicle.

The present invention in its second aspect provides, a travel support method to be executed in a travel support system that includes a server configured to support the travel of a vehicle, wherein the method comprises causing the server to recognize an obstacle on a travel path of the vehicle, obtain, upon detecting an approaching vehicle which is approaching the obstacle, a blind spot region which occurs due to the recognized obstacle, and notify the approaching vehicle of information of the obtained blind spot region, and the server is arranged in an apparatus other than the approaching vehicle.

The present invention in its third aspect provides, a non-transitory computer-readable storage medium storing a program for causing a server of a travel support system that supports the travel of a vehicle to recognize an obstacle on a travel path of the vehicle, obtain, upon detecting an approaching vehicle which is approaching the obstacle, a blind spot region which occurs due to the recognized obstacle, and notify the approaching vehicle of information of the obtained blind spot region, wherein the server is arranged in an apparatus other than the approaching vehicle in the travel support system.

According to the present invention, an occupant of the vehicle can be notified of the generation of a blind spot region.

DESCRIPTION OF THE EMBODIMENTS

Figure 1:
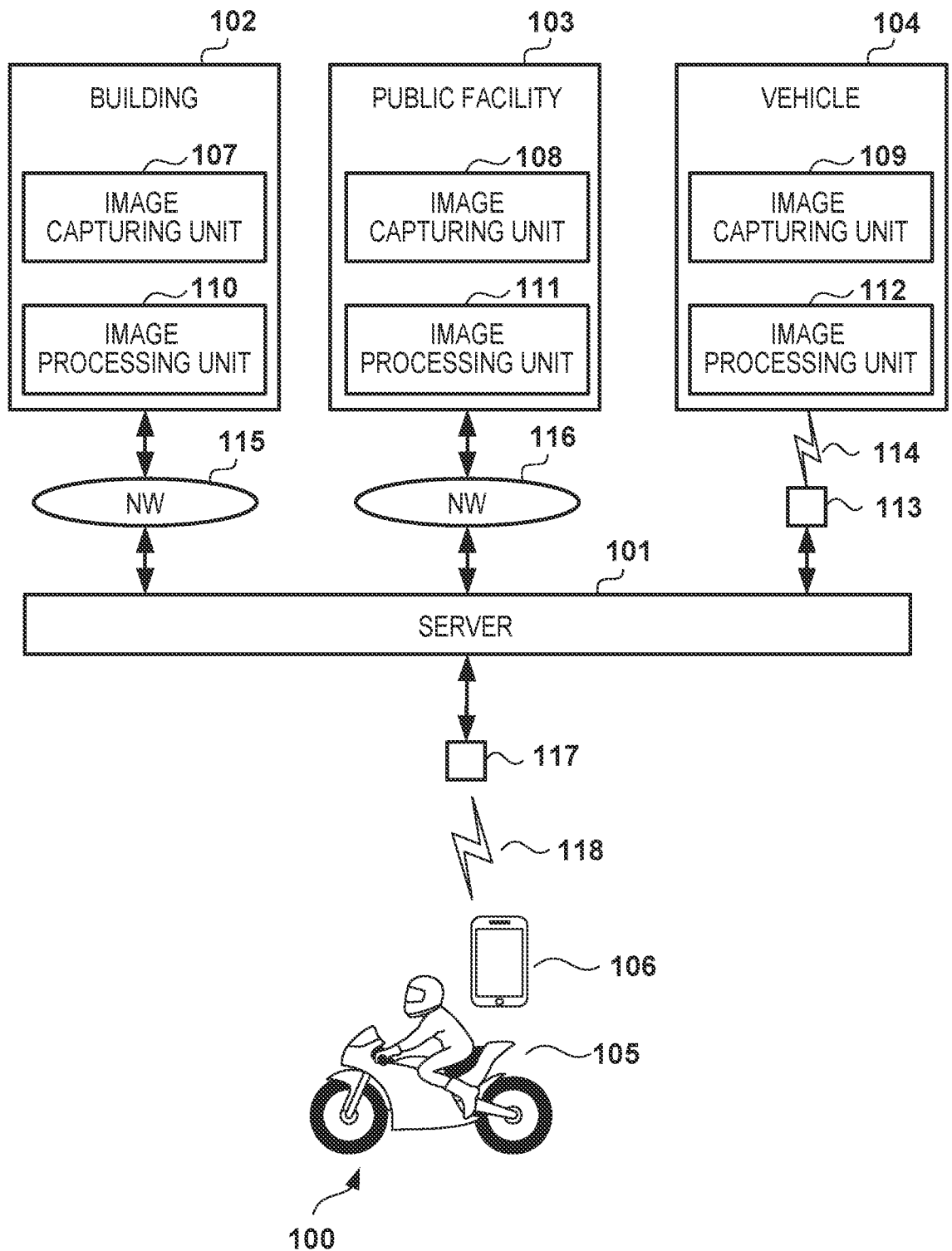
FIG. 1 is a view showing the arrangement of a travel support system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a view showing the arrangement of a travel support system according to this embodiment. A travel support system 100 includes a server 101 that provides a travel support service and base stations 113 and 117 that are connected to the server 101. The travel support system 100 includes vehicles 104 and 105, and the vehicle 104 is a four-wheeled vehicle and the vehicle 105 is a straddle-type two-wheeled vehicle in this embodiment. However, the vehicles 104 and 105 are not limited to the vehicle types shown in FIG. 1. For example, both vehicles may be four-wheeled vehicles or a straddle-type two-wheeled vehicles. Alternatively, the vehicles may be vehicles for specialized purposes. In addition, the vehicle 105 is not limited to a two-wheeled vehicle and may be, for example, a straddle-type three-wheeled vehicle. A portable terminal 106 is an apparatus that includes a portable terminal function including a GPS function. In this embodiment, an occupant (driver) of the vehicle 105 holds, for example, a smartphone as the portable terminal 106, and this smartphone is attached to the vehicle 105 by an attachment or the like. Also, the portable terminal function implemented by the portable terminal 106 may be included in the vehicle 105. The vehicle 104 and the server 101 can communicate with each other via wireless communication 114 with the base station 113. The vehicle 105, the portable terminal 106, and the server 101 can communicate with each other via wireless communication 118 with the base station 117. The vehicle 105 and the portable terminal 106 can also communicate with each other, and for example, the vehicle 105 can communicate with the server 101 via the portable terminal 106. Hence, in this embodiment, the wireless communication between the vehicle 105 and the base station 117 without the intervention of the portable terminal 106 need not be performed.

This embodiment assumes a case in which the vehicle 105 is traveling on a road in which buildings, and public facilities such as a traffic light, roadside devices, and the like are present. If a vehicle temporarily stops at the side of the road in this kind of a case, a side road of the road can suddenly become a blind spot region when viewed from the travel lane. In such a case, the occupant of the vehicle 105 traveling on the road can be notified of the occurrence of the blind spot region in this embodiment.

In FIG. 1, a building 102 is, for example, a building present on the side of the road, and a public facility 103 is a public facility such as a traffic light, a roadside device, or the like. The building 102 and the public facility 103 include image capturing units 107 and 108, respectively, such as monitoring cameras for monitoring a side road of the road and the like. The captured image data obtained by the image capturing unit 107 undergoes image processing by an image processing unit 110 and is transmitted to the server 101 via a network (NW) 115. The captured image data obtained by the image capturing unit 108 undergoes image processing by an image processing unit 111 and is transmitted to the server 101 via a network 116. The vehicle 104 includes an image capturing unit 109 such as a camera or the like for recognizing the external environment. The captured image data obtained by the image capturing unit 109 undergoes image processing by an image processing unit 112, and is transmitted to the server 101 via the wireless communication 114 between the base station 113. The image processing performed by the image processing units 110, 111, and 112 will be described later.

Figure 2:
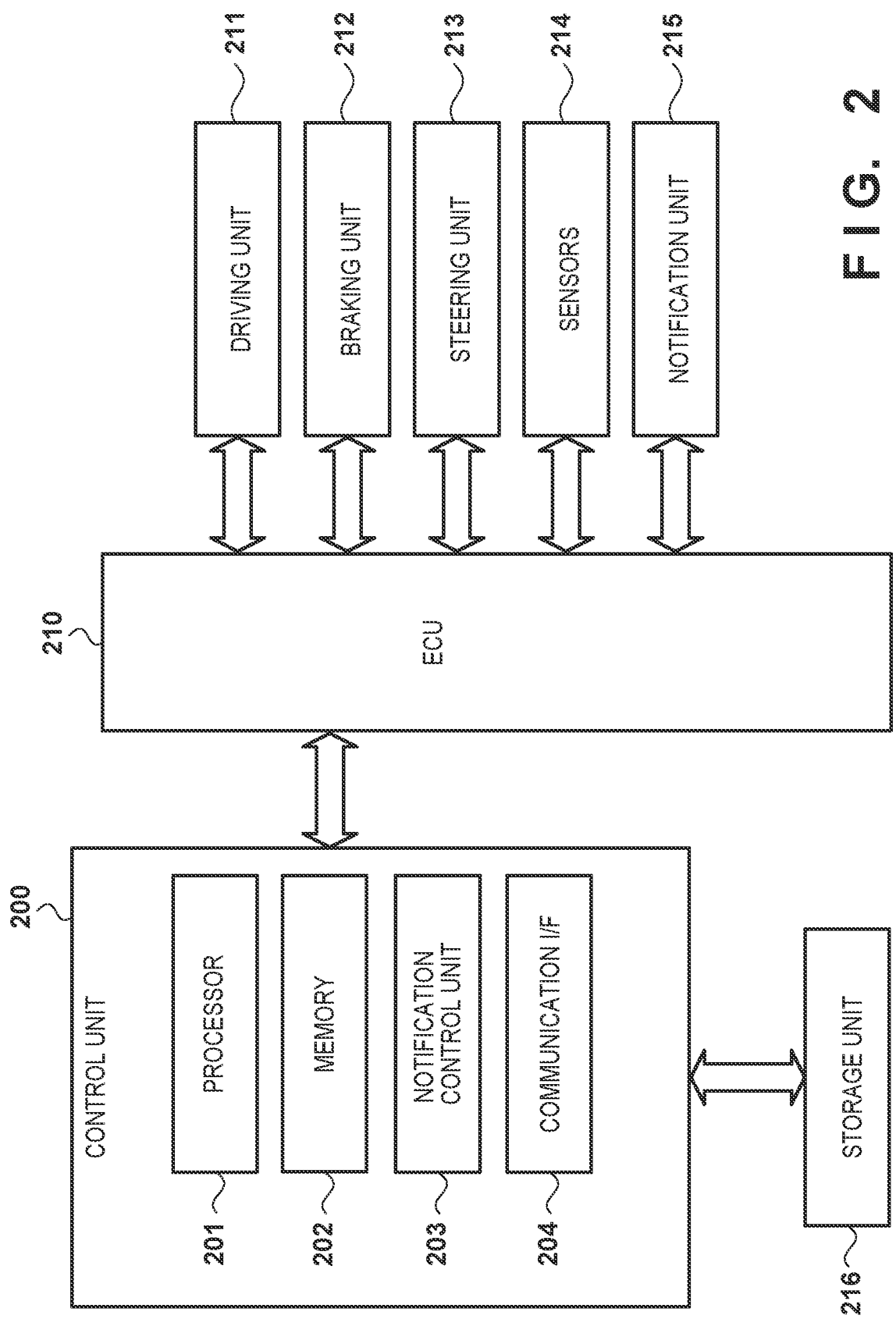
FIG. 2 is a block diagram showing the arrangement of a vehicle.

FIG. 2 is a diagram showing the block arrangement of the vehicle 105. As described above, the vehicle 105 is a straddle type two-wheeled vehicle in this embodiment. An ECU (Electronic Control Unit) 210 comprehensively controls each unit of the vehicle 105. The vehicle 105 has an arrangement in which travel control is performed by, for example, a throttle-by-wire method. The ECU 210 controls a driving unit 211 including an engine by opening/closing a throttle valve upon receiving an electrical signal of the throttle opening degree of a steering unit 213. A braking unit 212 includes a brake mechanism. Sensors 214 include various kinds of sensors such as a speed sensor, a throttle sensor, an atmosphere sensor, and the like, and the ECU 210 receives the detection signals from these sensors. A notification unit 215 includes a lamp, an LED, and the like, and is, for example, a lighting mechanism that displays the direction in which a blind spot region is present in this embodiment. The vehicle 105 may be arranged so that the portable terminal 106 can be attached to the vehicle 105 by an attachment.

A control unit 200 is a block that can execute wireless communication with the portable terminal 106 via a communication interface (I/F) 204. Note that the communication I/F 204 may be arranged so that wireless communication can be performed with the base station 117. The control unit 200 is a computer system that includes a processor 201 which comprehensively controls the operations in the control unit 200, a memory 202, a notification control unit 203, and the communication I/F 204. Each operation performed in the vehicle 105 according to this embodiment is implemented by, for example, causing the processor 201 to execute a program on the memory 202. The notification control unit 203 requests the ECU 210 to control the notification unit 215 based on the notification control data transmitted from the portable terminal 106. For example, the notification control unit 203 converts the notification control data transmitted from the portable terminal 106 into a signal which can be processed by the ECU 210, and transmits the signal to the ECU 210. In this embodiment, notification refers to processing performed to obtain recognition from the occupant of the vehicle 105 by displaying an image or a message on a panel, lighting a lamp, vibrating handlebar grips, and the like. For example, the notification control unit 203 converts the notification control data for causing the notification unit 215 to light the lamp and the notification control data for vibrating the handlebar grips of the steering unit 213 into signals that can be processed by the ECU 210, and transmits the converted signals to the ECU 210. The control unit 200 can also connect to a storage unit 216 such as a USB or the like. The vehicle 105 is not limited to the block arrangement shown in FIG. 2 and suitably includes, for example, functional blocks corresponding to the functions of the vehicle 105. For example, the vehicle 105 can be arranged to include a GPS for obtaining the GPS information of the vehicle 105 and a vehicle information transmission unit that can transmit the GPS information to an external device.

Figure 3:
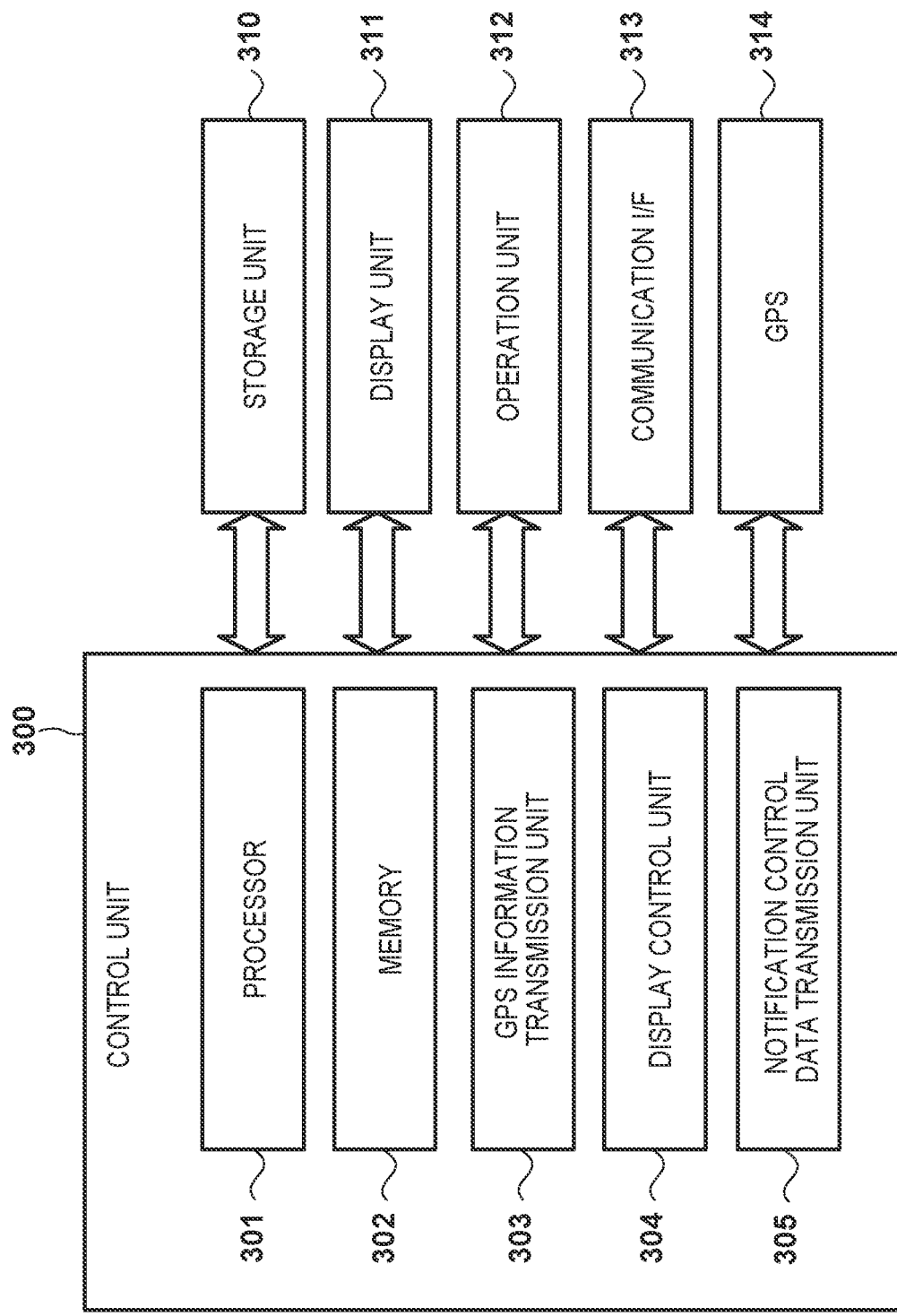
FIG. 3 is a diagram showing the block arrangement of a portable terminal.

FIG. 3 is a diagram showing the block arrangement of the portable terminal 106. A control unit 300 comprehensively controls the portable terminal 106. The control unit 300 is a computer system that includes a processor 301 which comprehensively controls the operations in the control unit 300, a memory 302, a GPS information transmission unit 303, a display control unit 304, and a notification control data transmission unit 305. Each operation of the portable terminal 106 according to this embodiment is implemented by, for example, causing the processor 301 to execute a program on the memory 302. The GPS information transmission unit 303 transmits the GPS information obtained by a GPS 314 to an external device via a communication unit I/F 313. The display control unit 304 controls the display performed on a display unit 311. The notification control data transmission unit 305 generates, based on the notification control data transmitted from the server 101, the notification control data to be used in the vehicle 105, and transmits the generated data to the vehicle 105 via the communication unit I/F 313.

A storage unit 310 stores programs and data used by the portable terminal 106 to operate and the programs and data required for the operation of this embodiment. For example, an application to be provided from the server 101 is stored in the storage unit 310. For example, a user of the portable terminal 106 will activate the application to perform registration to the server 101 and perform pairing with the control unit 200 of the vehicle 105 on a setting screen. The display unit 311 is, for example, a touch panel and displays various kinds of user interface screens to the user of the portable terminal 106. Note that in this embodiment, the user of the portable terminal 106 corresponds to the occupant of the vehicle 105. An operation unit 312 can accept an operation from the user and includes hard keys and soft keys displayed on the touch panel. The GPS (Global Positioning System) 314 is a position detection mechanism for detecting the current position of the portable terminal 106. The communication unit I/F 313 can execute wireless communication 118 with an external device. Note that the communication unit I/F 313 may be arranged to support a plurality of wireless communication operations performed at different communication distances. The portable terminal 106 is not limited to the block arrangement shown in FIG. 3, and suitably includes functional blocks corresponding to the functions of the portable terminal 106.

Although the vehicle 105 is described to be a straddle type two-wheeled vehicle in this embodiment, it may be another type of a vehicle, for example, a four-wheeled vehicle. In such a case, the control unit 200 of FIG. 2 and the control unit 300 of FIG. 3 may be integrally arranged in the four-wheeled vehicle.

Figure 4:
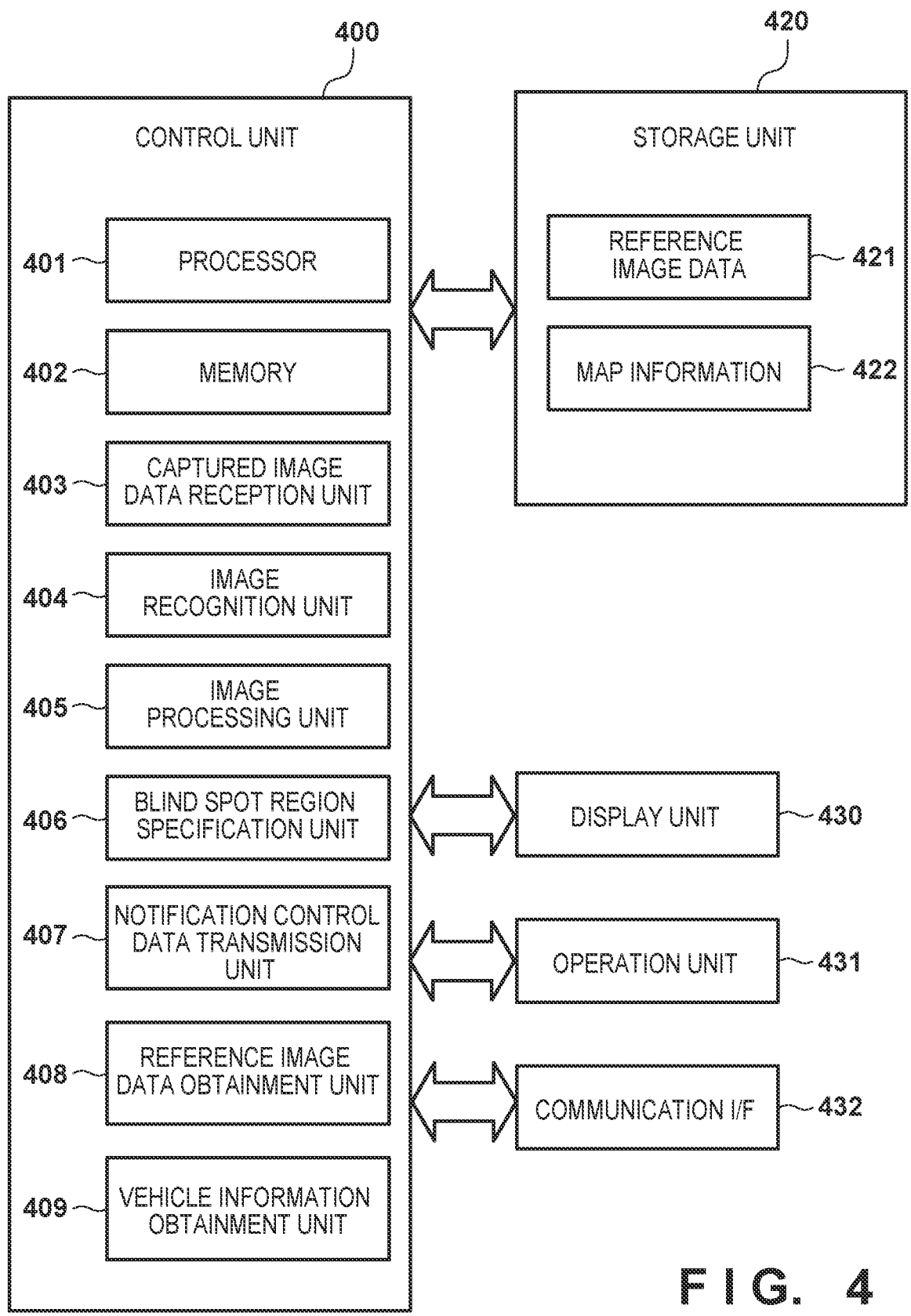
FIG. 4 is a diagram showing the block arrangement of a server.

FIG. 4 is a diagram showing the block arrangement of the server 101. A control unit 400 comprehensively controls the server 101. The control unit 400 is a computer system that includes a processor 401 which comprehensively controls the operations in the control unit 400, a memory 402, a captured image data reception unit 403, an image recognition unit 404, an image processing unit 405, a blind spot region specification unit 406, a notification control data transmission unit 407, a reference image data obtainment unit 408, and a vehicle information obtainment unit 409. Each operation of the server 101 according to this embodiment is implemented by, for example, causing the processor 401 to execute a program on the memory 402. The captured image data reception unit 403 receives the captured image data transmitted from the building 102, the public facility 103, and the vehicle 104. In this embodiment, for example, a region near the side of the road including a stopped vehicle has been captured in the captured image data. The image recognition unit 404 uses, for example, a method such as classification or the like to recognize an object in the captured image data received by the captured image data reception unit 403. The image processing unit 405 performs, for example, modeling of the object in the image data. The image processing units 110, 111, and 112 can also execute image processing operations similar to those performed by the image processing unit 405. The blind spot region specification unit 406 can specify, based on the captured image data received by the captured image data reception unit 403, a blind spot region that has occurred due to, for example, a stopped vehicle on the side of the road. The notification control data transmission unit 407 generates, based on the result of the specification of the blind spot region by the blind spot region specification unit 406, the notification control data (to be described later) and transmits the generated notification control data to the portable terminal 106.

The reference image data obtainment unit 408 generates the reference image data based on the captured image data received by the captured image data reception unit 403. Reference image data is image data representing a state in which a blind spot region has not suddenly occurred, and is, for example, captured image data representing a state in which the stopped vehicle is absent in the case described above. The reference image data obtainment unit 408 periodically collects the captured image data from the image capturing units of the building 102, the public facility 103, and the vehicle 104, recognizes moving bodies such as a pedestrian, a bicycle, and the like, and generates image data in which these moving bodies have been removed. The reference image data obtainment unit 408 stores the generated reference image data as reference image data 421 in a storage unit 420. The reference image data 421 is periodically updated in accordance with the periodic generation of the reference image data by the reference image data obtainment unit 408. As a result, it is possible to prevent the degradation of obstacle recognition accuracy (to be described later in FIG. 9). The vehicle information obtainment unit 409 obtains the GPS information transmitted from the GPS information transmission unit 303 of the portable terminal 106. The vehicle information obtainment unit 409 can also obtain information such as the vehicle type, vehicle height, and the like of the vehicle 105 that has been preregistered via an application by the occupant of the vehicle 105.

The storage unit 420 stores the programs and data used by the server 101 to operate and the programs and the data required for the operation of this embodiment. The storage unit 420 also stores the reference image data 421 and map information 422. The reference image data 421 is reference image data obtained by the reference image data obtainment unit 408. The map information 422 is, for example, a map database. Note that the map information 422 need not be formed in the storage unit 420 and may be obtained from an external database server. The storage unit 420 may also store other pieces of information, and may store, for example, the user information of the portable terminal 106 and the vehicle information (vehicle type and the like) of the vehicle 105 in association with each other.

A display unit 430 is, for example, a display, and displays various kinds of user interface screens to a user of the server 101. An operation unit 431 can accept an operation from the user and is, for example, a keyboard or a pointing device. A communication I/F 432 can execute communication with the base stations 113 and 117 and the networks 115 and 116. The server 101 is not limited to the block arrangement shown in FIG. 4 and suitably includes functional blocks corresponding to the functions of the server 101. For example, a database for weather information or road surface information for indicating an icy road and the like may be included. Note that although the server 101 is illustrated as a single apparatus in FIG. 4, it may be formed by a plurality of apparatuses. That is, the server 101 according to this embodiment includes an arrangement for providing a server function by a single apparatus and an arrangement for providing a server function in cooperation by a plurality of apparatuses.

Figure 5A:
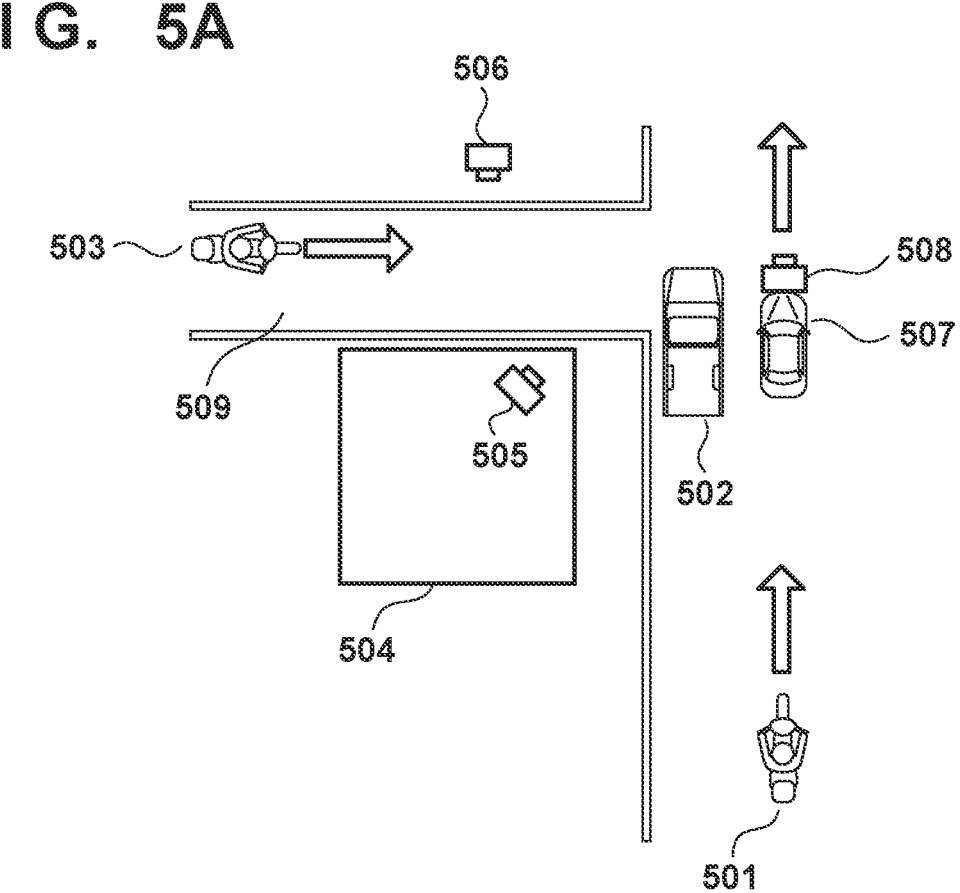
FIGS. 5A and 5B are views for explaining an operation according to an embodiment.
Figure 5B:
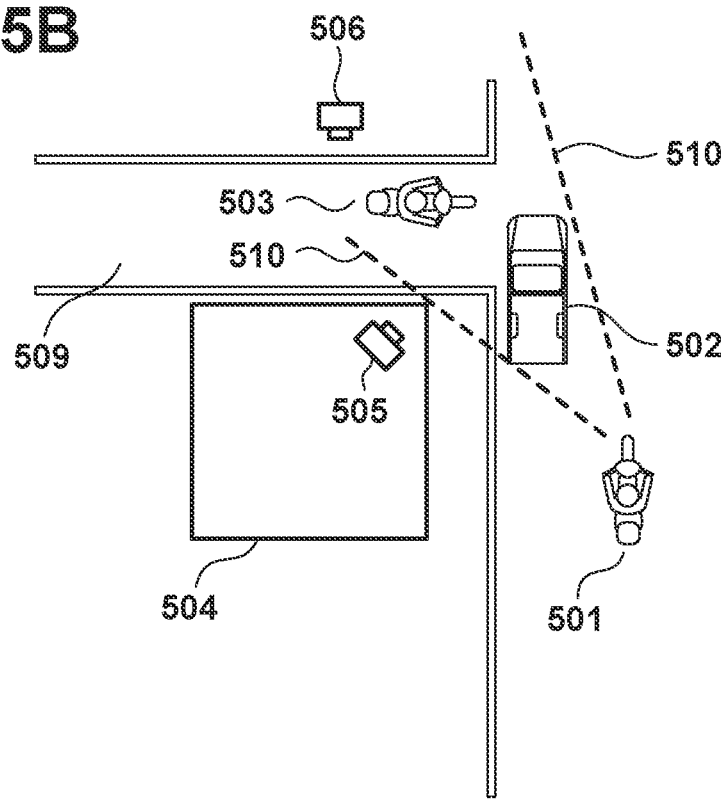

The operation of this embodiment will be described below with reference to FIGS. 5A and 5B. As shown in FIG. 5A, a vehicle 501 is traveling on a road in the direction of an arrow. In addition, a side road 509 with respect to the road is present, and a building 504 is present at a corner portion of the road and the side road. An image capturing unit 505 which is a monitoring camera for monitoring the corner portion is arranged on the building 504. An image capturing unit 506 which is monitoring camera for monitoring the side road portion is also arranged on a public facility on the side road. In addition, other than the vehicle 501, a vehicle 507 set with an image capturing unit 508 such as a camera for recognizing the outside is traveling on the road. The vehicle 501 corresponds to the vehicle 105 and the building 504 corresponds to the building 102 of FIG. 1. Also, the image capturing unit 505 corresponds to the image capturing unit 107 and the image capturing unit 506 corresponds to the image capturing unit 108 of FIG. 1. Furthermore, the vehicle 507 corresponds to the vehicle 104 of FIG. 1.

In the state shown in FIG. 5A, a stopped vehicle 502 has stopped temporarily on the side of the road. In this case, assume that the vehicle 501 has advanced in the direction of the arrow and the state shown in FIG. 5A has changed to the state shown in FIG. 5B. For example, in a case in which the vehicle height of the stopped vehicle 502 is higher than the position of the eye of the occupant of the vehicle 501, the far side of the stopped vehicle 502 sandwiched by lines 510 will be a blind spot region in the perspective of the occupant of the vehicle 501. For example, assume a case in which a bicycle 503 is traveling on the side road 509 in the manner shown in FIGS. 5A and 5B in such a state. Although the occupant of the vehicle 501 will be able to see the bicycle 503 if the stopped vehicle 502 is not present, the occupant of the vehicle 501 will not be able to see the bicycle 503 because of the blind spot region that occurred due to the stopped vehicle 502.

Hence, in this embodiment, when the stopped vehicle 502 is recognized based on the captured image data obtained by the image capturing units 505, 506, and 508, the occupant of the vehicle 501 will be notified of the occurrence of the blind spot region due to the stopped vehicle 502. This kind of an arrangement can make the occupant of the vehicle 501 be aware of the blind spot region that has suddenly occurred.

Figure 6:
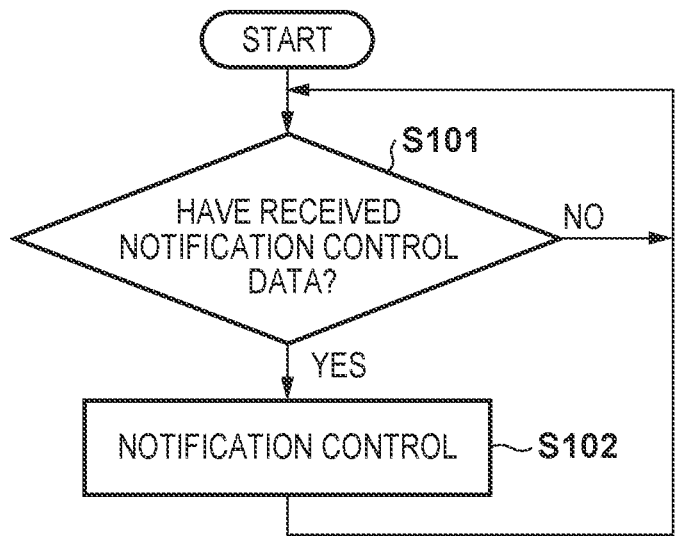
FIG. 6 is a flowchart showing processing executed in the vehicle.

FIG. 6 is a flowchart showing processing to be executed in the vehicle 105. The processing of FIG. 6 is implemented by, for example, causing the processor 201 to execute a program on the memory 202.

In step S101, the processor 201 determines whether the notification control unit 203 has received the notification control data from the portable terminal 106. If it is determined that the notification control data has not been received, the process is repeated from step S101. On the other hand, if it is determined that the notification control data has been received, the processor 201 causes, in step S102, the notification control unit 203 to request the ECU 210 to cause the notification unit 215 to perform a notification operation based on the notification control data. For example, data representing "a blind spot region is present on the left side", which has been transmitted from the portable terminal 106, is converted into a signal, for example, a signal to light up the LED on the left side, which can be processed by the ECU 210, and the converted signal is transmitted to the ECU 210. After the process of step S102, the process is repeated from step S101. Also, the notification unit 215 may be configured to output a sound from a loudspeaker or output a display on the panel. In such a case, a sound or a message may be output based on the data transmitted from the portable terminal 106. The processor 201 may request, via the notification control unit 203, the ECU 210 to cause the handlebar grips of the steering unit 213 to vibrate based on the notification control data.

Figure 7:
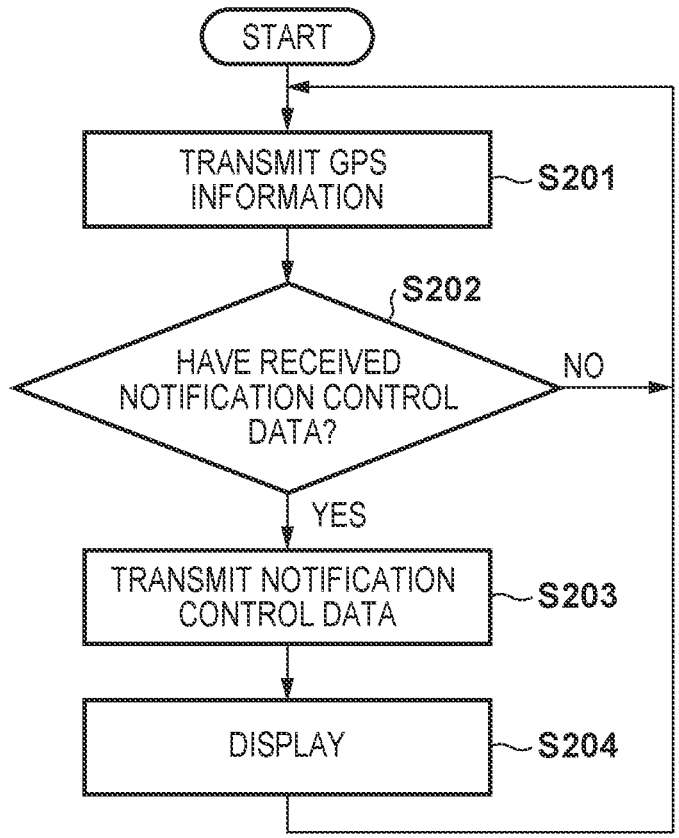
FIG. 7 is a flowchart showing processing executed in the portable terminal.

FIG. 7 is a flowchart showing the processing to be executed in the portable terminal 106. The processing of FIG. 7 is implemented by, for example, causing the processor 301 to execute a program on the memory 302.

In step S201, the processor 301 transmits, via the GPS information transmission unit 303, the GPS information obtained by the GPS 314 to the server 101 together with the identification information of the portable terminal 106 or the vehicle 105. In this embodiment, the GPS information of the portable terminal 106 is used as the GPS information of the vehicle 105. It may also be arranged so that the GPS information will be transmitted from the vehicle 105 to the server 101.

In step S202, the processor 301 determines, via the notification control data transmission unit 305, whether notification control data has been received from the server 101. If it is determined that the notification control data has not been received, the process is repeated from step S201. On the other hand, if it is determined that the notification control data has been received, the process advances to step S203.

Figure 16A:
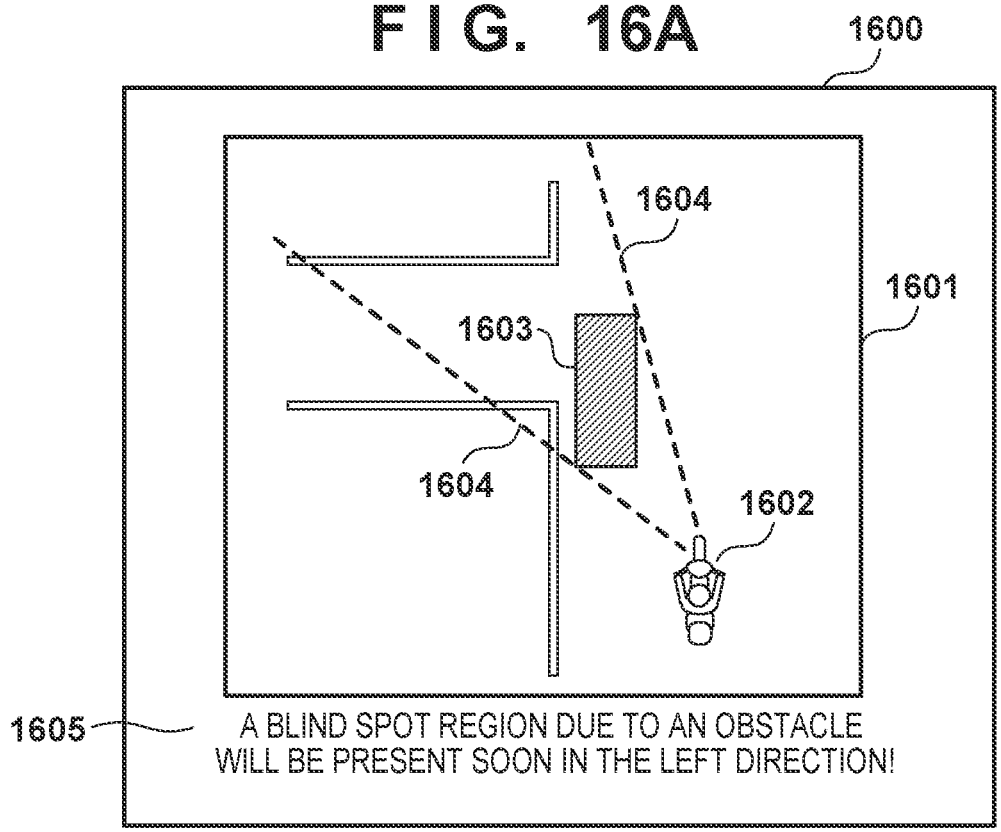
FIGS. 16A and 16B are views showing a display screen.

The notification control data will be described. The notification control data is information indicating whether a blind spot region is present in any direction with respect to the direction of travel of the vehicle 105, and is received as, for example, data to be displayed on the panel or the like. A display screen 1600 shown in FIG. 16A is a view showing an example of a display screen which is displayed based on the notification control data. The portable terminal 106 can display the display screen 1600 on the display unit 311 based on the notification control data received from the server 101.

In the display screen 1600, a display region 1601 is displayed. A vehicle 1602 in the display region 1601 corresponds to the vehicle 105 and indicates the virtual position of the vehicle 105 when the blind spot region occurs. In FIG. 16A, the presence of a blind spot region 1604 due to an obstacle 1603 on the left side of the direction of travel of the vehicle 105 is graphically displayed. Also, a message such as "A blind spot region caused by an obstacle will occur shortly in the left direction" is displayed in a display region 1605 to prompt the attention of the occupant of the vehicle 105.

In step S203, the processor 301 causes the notification control data transmission unit 305 to generate, based on the notification control data received from the server 101, the notification control data which can be used to notify the notification unit 215 of the vehicle 105 and transmits the generated notification control data to the vehicle 105. For example, if the notification unit 215 of the vehicle 105 is configured to notify the occupant of one of the left direction and the right direction via LED, the processor 301 will cause the notification control data transmission unit 305 to transmit, to the vehicle 105, the data corresponding to "the left direction" as the notification control data based on the notification control data received from the server 101.

In step S204, the processor 301 causes the display control unit 304 to make the display unit 311 perform a display operation based on the notification control data received from the server 101. In step S204, for example, the display screen 1600 is displayed. After the process of step S204, the process is repeated from step S201.

In the above-described processing, it was described that the processor 301 will generate, based on the notification control data received from the server 101, the notification control data to be used for performing control in the vehicle 105 in step S203. However, it may be arranged so that the processor 301 will transfer the notification control data received from the server 101 to the vehicle 105. In such a case, the notification control unit 203 of the vehicle 105 will generate the notification control data which can be used to perform the notification operation by the notification unit 215 or the steering unit 213 based on the notification control data received from the portable terminal 106.

In addition, although it has been described above that a display operation will be performed in step S204, it may be set so that the process will be repeated from step S201 after the process of step S203 without performing the process of step S204. Also, it may be arranged so that whether the display operation of step S204 is to be performed can be set on the user interface screen displayed on the display unit 311 of the portable terminal 106 of the vehicle 105. As a result, for example, display control can be performed so that a display operation will be performed in step S204 in a case in which the portable terminal 106 is attached to the vehicle 105 by an attachment by this kind of an arrangement, and the display operation will not be performed in step S204 in a case in which the portable terminal 106 is stored in a bag or the like of the occupant of the vehicle 105.

Figure 8:
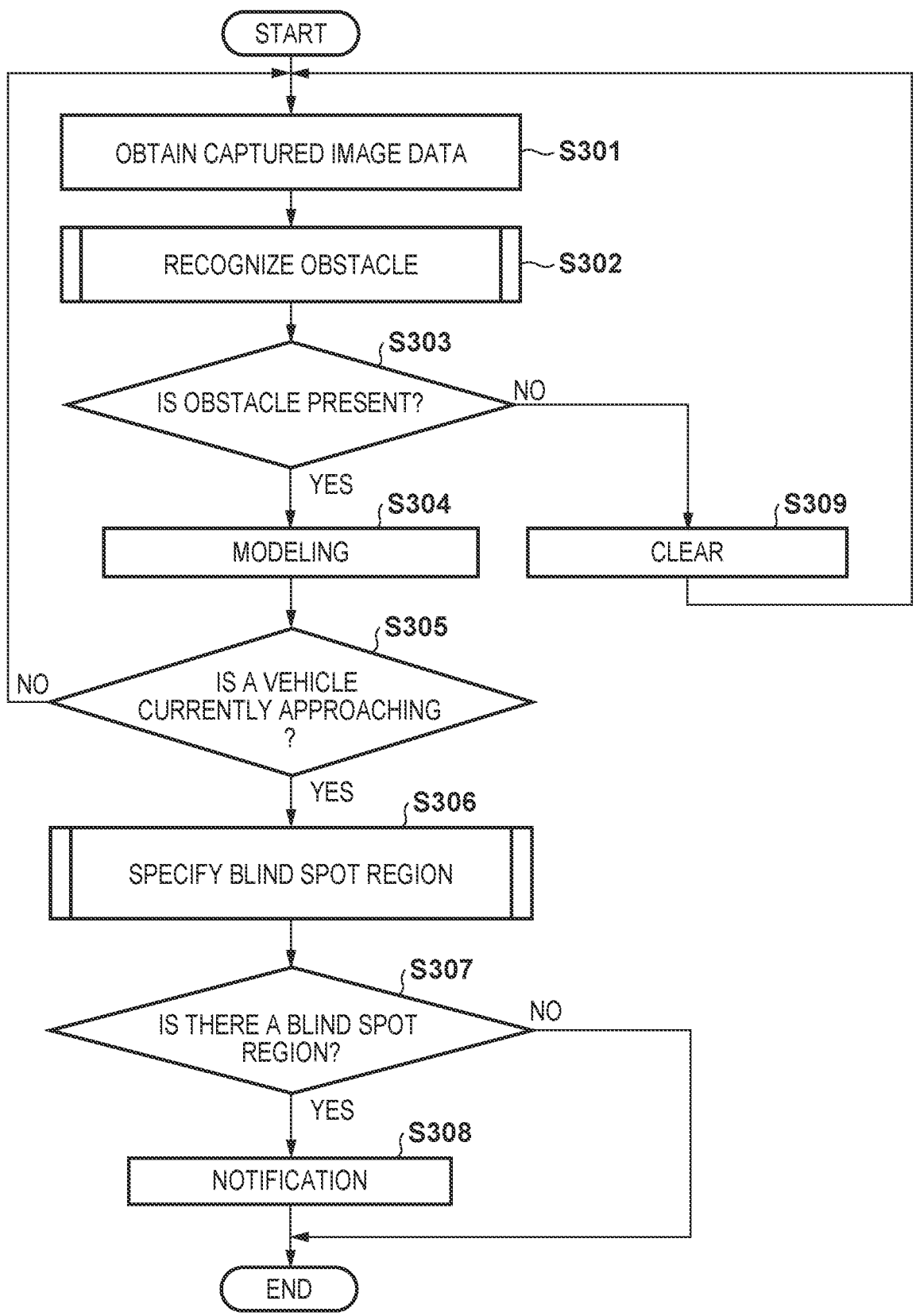
FIG. 8 is a flowchart showing processing executed in the server.

FIG. 8 is a flowchart showing the processing to be executed in the server 101. The processing of FIG. 8 is implemented by, for example, causing the processor 401 to execute a program on the memory 402.

In step S301, the processor 401 receives the captured image data by the captured image data reception unit 403. The captured image data received here is not the captured image data obtained by the vehicle 105 and the portable terminal 106, but is at least one of the captured image data obtained by the image capturing unit 107 of the building 102, the captured image data obtained by the image capturing unit 108 of the public facility 103, and the captured image data obtained by the image capturing unit 109 of the vehicle 104.

The processor 401 causes, in step S302, the image recognition unit 404 to perform obstacle recognition, and determines, in step S303, whether an obstacle is present.

Figure 9:
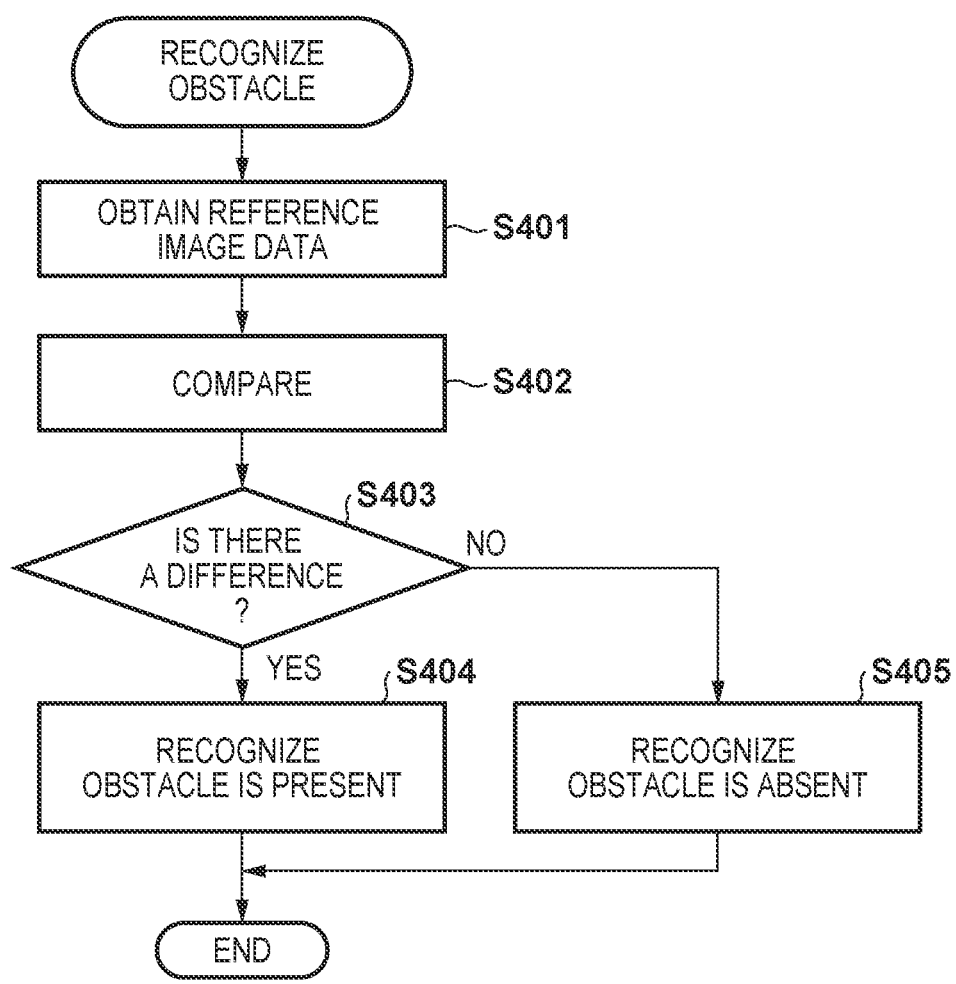
FIG. 9 is a flowchart showing obstacle recognition processing of step S302.

FIG. 9 is a flowchart showing the obstacle recognition processing of step S302. In step S401, the processor 401 obtains the reference image data 421 from the storage unit 420. The processor 401 compares, in step S402, the reference image data 421 and the captured image data received in step S301, and determines, in step S403, whether there is a difference based on the result of the comparison. For example, if a still object which has a predetermined size (for example, a predetermined height) or more and is not present in the reference image data 421 is recognized in the captured image data, it will be determined that there is a difference. Alternatively, it may be set so that it will be determined that there is a difference in a case in which a stopped vehicle that has stopped on the side of the road has been recognized. For example, the image recognition unit 404 may recognize, as a stopped vehicle, a vehicle that is an object whose license plate has been recognized and which has stopped for a predetermined time.

In addition, it may be arranged so the recognition processing will not be performed on moving objects such as a pedestrian, a bicycle, and the like by excluding these objects as determination targets. The determination processing can become more efficient by employing such an arrangement. If it is determined that there is a difference in step S403, it will be recognized that an obstacle is present in step S404, and this recognition result will be stored in a storage area such as the memory 402 or the like. On the other hand, if it is determined that there is no difference, it will be determined that an obstacle is absent, and this recognition result will be stored in a storage area such as the memory 402 or the like. After the processes of steps S404 and S405, the processing of FIG. 9 ends.

In step S303 of FIG. 8, the processor 401 will determine whether an object is present based on the object recognition result of step S302, and repeat the process from step S301 if it is determined that an obstacle is not present. In this case, if it is recognized in step S303 that an obstacle is present, is determined in the subsequent step S305 that no approaching vehicle is present, and is determined again in step S303 that the obstacle is absent, the processor 401 will clear, in step S309, the data and the like of the modeling performed in step S304 and repeat the process from step S301. Note that the case described above is, for example, a case in which a stopped vehicle which had temporarily stopped has started to travel again. On the other hand, if it is determined that an obstacle is present, the process will advance to step S304. In step S304, the processor 401 will cause the image processing unit 405 to perform obstacle modeling.

Figure 15A:
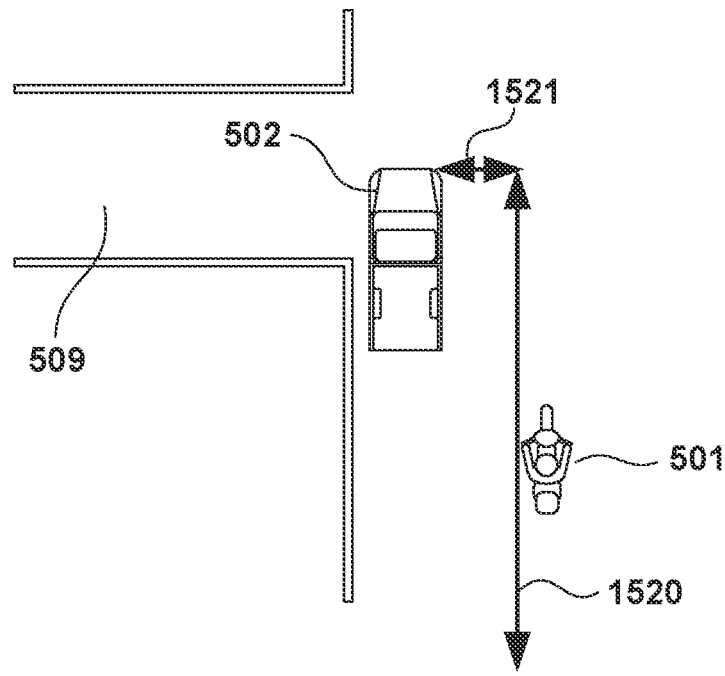
FIGS. 15A to 15D are views for explaining obstacle modeling.

FIGS. 15A to 15D are views for explaining obstacle modeling performed in step S304. FIG. 15A is a view showing a state in which the vehicle 501 has approached the stopped vehicle 502. The image processing unit 405 will generate a simplified model of the stopped vehicle 502 based on the recognition result of the image recognition unit 404. For example, the image processing unit 405 will obtain the maximum vehicle width, the maximum vehicle height, and the maximum vehicle length from the three-dimensional shape of the stopped vehicle 502 that has been recognized, and generate a cuboid model from these obtained values. That is, the image processing unit 405 generates a circumscribed cuboid model of the stopped vehicle 502 from the recognition result of the stopped vehicle 502.

Figure 15B:
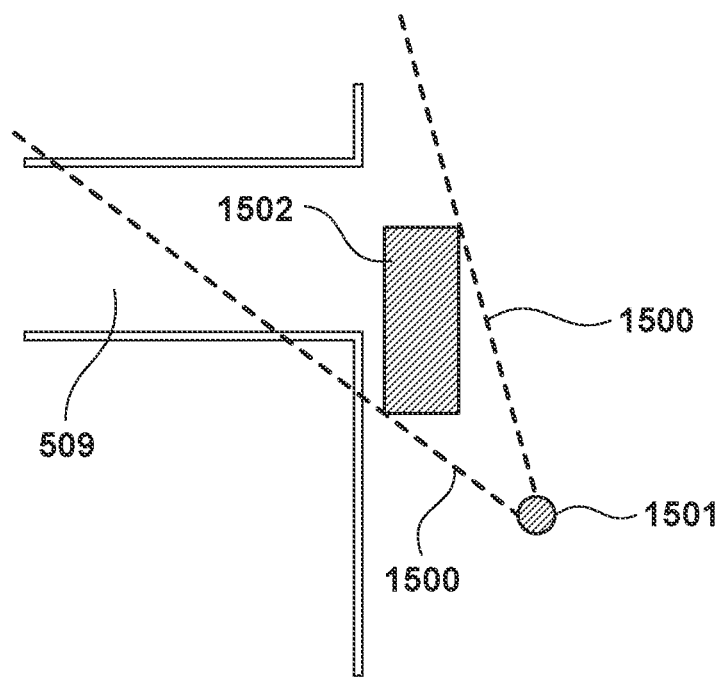
Figure 15C:
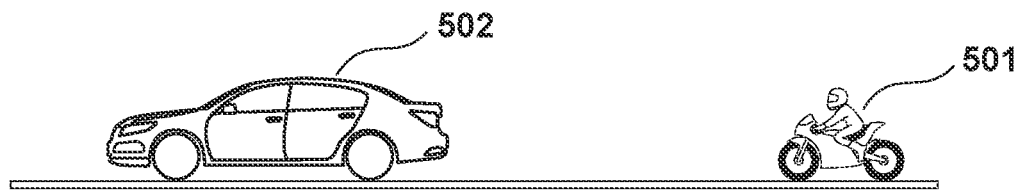
Figure 15D:
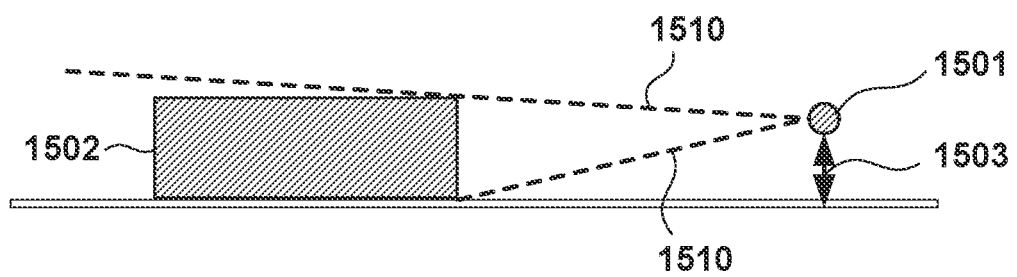

The stopped vehicle 1502 of FIG. 15B is a simplified model of the stopped vehicle 502 of FIG. 15A in the horizontal direction. Also, FIG. 15C is a view in which FIG. 15A is seen from the left side of the drawing, and FIG. 15D is a view in which FIG. 15B is seen from the left side of the drawing. A stopped vehicle model 1502 of FIG. 15D is a simplified model of the stopped vehicle 502 of FIG. 15C in the vertical direction.

After obstacle modeling has been performed in step S304, the processor 401 uses, in step S305, the vehicle information obtainment unit 409 to determine whether an approaching vehicle is present in a predetermined area that includes the obstacle. If it is determined that an approaching vehicle is absent, the process is repeated from step S301. On the other hand, if it is determined that an approaching vehicle is present, the process advances to step S306. In step S306, the processor 401 causes the blind spot region specification unit 406 to specify a blind spot region.

Figure 10:
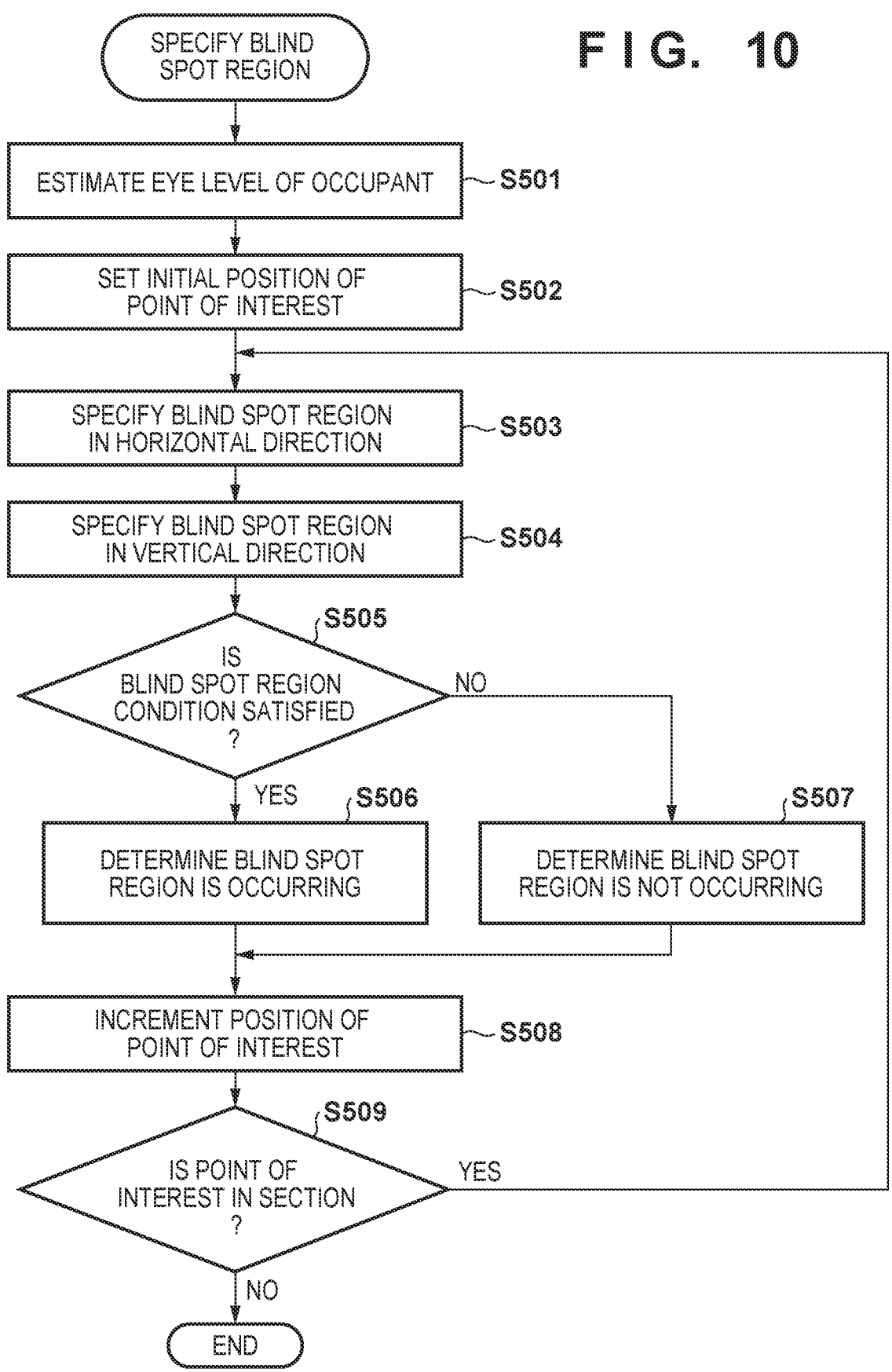
FIG. 10 is a flowchart showing blind spot region specification processing of step S306.

FIG. 10 is a flowchart showing the blind spot region specification processing of step S306. In step S501, the processor 401 estimates, based on the information related to the vehicle such as the vehicle type, the vehicle height, and the like of the vehicle 501, a point positioned at the eye level of the occupant of the vehicle 501. In this case, the information related to the vehicle of the vehicle 501 may be registered in advance in, for example, the server 101 by the occupant of the vehicle 501 via an application of the portable terminal 106. A vehicle model 1501 shown in FIGS. 15B and 15D is a model obtained by setting the point estimated in step S501 as the model of the vehicle 501. As shown in FIG. 15D, the vehicle model 1501 is positioned at an eye level 1503 of the occupant of the vehicle 501.

In step S502, the processor 401 sets the initial position of a point of interest to be used in the specification of a blind spot region. A section 1520 of FIG. 15A is a predetermined section set on the travel path of the vehicle 501 based on the stopped vehicle 502 as a reference. For example, the section 1520 is a section which is on a travel path away from the stopped vehicle 502 by a predetermined distance 1521 in the vehicle width direction and is 10 m from the front end of the stopped vehicle 502 to the rear. Note that the section 1520 and the predetermined distance 1521 may be determined in accordance with the size of the stopped vehicle 502. In step S502, the start point (the farthest position, that is, a position 10 m from the stopped vehicle 502 in the rear direction in the above-described example) of the section 1520 is set as the initial point of the point of interest. The section 1520 and the predetermined distance 1521 may also be determined based on the state of the vehicle 501, for example, the speed of the vehicle 501. For example, in a case in which the vehicle 501 is approaching at a speed equal to or more than the threshold, the section 1520 can be further shortened. This can further reduce the number of repetitions of the processes of steps S503 to S509, thereby reducing the time until the execution of the notification processing of step S308.

In step S503, the processor 401 specifies a blind spot region in the horizontal direction. For example, two tangent lines 1500 are set from the vehicle model 1501 with respect to the stopped vehicle model 1502, and a region between these two tangent lines is specified as the blind spot region in the horizontal direction. In step S504, the processor 401 specifies a blind spot region in the vertical direction. For example, two tangent lines 1510 are set from the vehicle model 1501 with respect to the stopped vehicle model 1502, and a region between these tangent lines is specified as the blind spot region in the vertical direction.

In step S505, the processor 401 determines whether the specified blind spot region satisfies a condition. For example, it will be determined that the specified blind spot region satisfies the condition if both an angle formed by the two tangent lines 1500 and an angle formed by the two tangent lines 1510 are equal to or larger than a predetermined value. Also, for example, if one of the angle formed by the two tangent lines 1500 and the angle formed by the two tangent lines 1510 is less than the predetermined value, it will be determined that the specified blind spot region does not satisfy the condition. If it is determined that the condition is satisfied in step S505, the processor 401 will determine, in step S506, that a blind spot region has occurred and store this determination result in a storage area such as the memory 402 or the like. On the other hand, if it is determined that the condition is not satisfied in step S505, the processor 401 will determine, in step S507, that a blind spot region has not occurred and store this determination result in a storage area such as the memory 402 or the like. After the processes of steps S506 and S507, the process advances to step S508.

In step S508, the processor 401 increments the position of the point of interest set in step S502 by a predetermined distance in the direction of travel of the vehicle 501, and determines, in step S509, whether the incremented point of interest falls within the section 1520. If it is determined that the incremented point of interest falls within the section 1520, the process is repeated from step S503. On the other hand, if it is determined that the incremented point of interest does not fall within the section 1520, that is, if the incremented point of interest has reached a position corresponding to the head of the stopped vehicle 502, the processing of FIG. 10 ends.

Referring back to FIG. 8, in step S307, the processor 401 determines, based on the determination result stored the storage area in step S506 or S507, whether a blind spot region has occurred. If it is determined that a blind spot region has not occurred, the processing of FIG. 8 ends. On the other hand, if it is determined that a blind spot region has occurred, the process advances to step S308.

In step S308, the processor 401 causes the notification control data transmission unit 407 to generate the notification control data to be used to notify the vehicle 105 of the fact that a blind spot region has occurred, and transmits the generated notification control data to the portable terminal 106. The notification control data to be generated here is, for example, control data for vibrating the handlebar grips of the steering unit 213 and display data for displaying the display screen 1600 of FIG. 16A. In the case of the display data, the screen to be displayed in the display region 1601 may be generated based on a state in which the angle formed by the two tangent lines 1500 in the processing of FIG. 10 will have the largest value. After the process of step S308, the processing of FIG. 8 ends.

In the processing of FIG. 8, the processes of steps S301 to S305 and the processes of steps S306 to S308 can be executed separately as independent processes. For example, the processes of step S301 to S305 may be arranged to be performed repeatedly at a predetermined time interval even in a case in which it has been determined that an approaching vehicle is present in step S305.

As described above, according to this embodiment, in a case in which it is determined that a blind spot region has suddenly occurred due to a stopped vehicle which has temporarily stopped on the side of the road, the vehicle 105 that is approaching close to this area can be notified of the occurrence of the blind spot region. In addition, the determination of the occurrence of the blind spot region is determined based on the size of the approaching vehicle 105. For example, in a case in which the vehicle 105 is a large vehicle with a high vehicle height and the vehicle height of the stopped vehicle is low, the angle between the tangent lines 1510 will be less than the predetermined value, and it will be determined that the condition of the blind spot region is not satisfied in step S505 of FIG. 10. Since the notification operation to the vehicle 105 will not be performed in such a case, it will be possible to prevent the occurrence of an unnecessary notification.

As described in step S304 of FIG. 8, in this embodiment, the processor 401 of the server 101 causes the image processing unit 405 to generate a simplified model based on the captured image data obtained in step S301. In this case, the processing to generate the simplified model may be performed by each apparatus other than the server 101. For example, the processing to generate the simplified model may be performed by the image processing units 110, 111, and 112 of the building 102, the public facility 103, and the vehicle 104, respectively.

Figure 17:
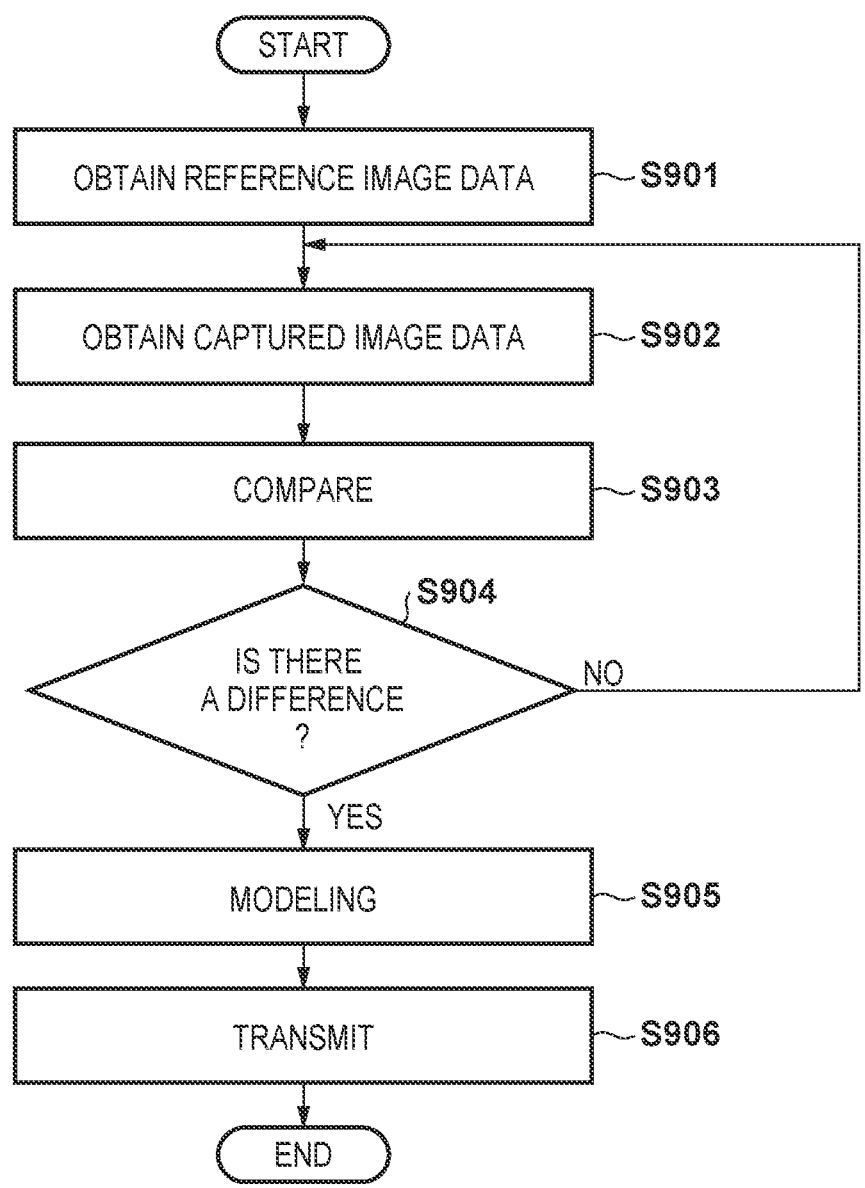
FIG. 17 is a flowchart showing processing to be executed by an apparatus other than the server.

FIG. 17 is a flowchart showing the processing to be performed by an apparatus other than the server 101. The processing of FIG. 17 is implemented by, for example, causing the processor of each apparatus in which the corresponding image processing unit is arranged to execute a program on the memory.

In step S901, each processor obtains the reference image data from the server 101. For example, the processors of the building 102 and the public facility 103 may periodically obtain the reference image data from the server 101 at a predetermined time. Also, the processor of the vehicle 104 may obtain the reference image data when, for example, the vehicle 104 has temporarily stopped at an intersection or the like near the building 102 and the public facility 103.

In step S902, each processor obtains the captured image data obtained by the corresponding image capturing unit. In this case, the image capturing units are, for example, the image capturing units 107, 108, and 109 of the building 102, the public facility 103, and the vehicle 104, respectively.

In step S903, each processor compares the reference image data obtained in step S901 and the captured image data obtained in step S902, and determines, in step S904, whether there is a difference based on the comparison result. In a similar manner to the process of step S402 of FIG. 9, a difference will be determined if a stopped vehicle that has stopped on the side of the road is recognized in the captured image data. For example, a vehicle that is an object whose license plate has been recognized and which has stopped for a predetermined time may be recognized as a stopped vehicle. On the other hand, moving objects such as a pedestrian, a bicycle, and the like are not set as determination targets. If no difference is recognized in step S904, the process is repeated from step S902. In this case, it may be set so that the processor of the vehicle 104 will end the process of FIG. 17 if the vehicle 104 has ended the temporary stop and started traveling again. If a difference is recognized in step S904, each processor will perform obstacle modeling by the corresponding imaging processing unit in step S905. The modeling processing performed in step S905 is similar to that performed in step S304. Next, in step S906, the simplified model generated in step S905 is transmitted together with the corresponding position information from each processor to the server 101. Subsequently, the processing of FIG. 17 ends. The simplified model transmitted in step S906 is used for blind spot region specification processing in step S306 of FIG. 8 when an approaching vehicle is present.

In this manner, by generating a simplified model in each apparatus other than the server 101, the communication amount can be suppressed and the communication efficiency can be improved compared to a case in which the captured image data is transmitted from the building 102, the public facility 103, and the vehicle 104.

Second Embodiment

The first embodiment described an arrangement in which a vehicle 105 which is approaching the vicinity of a stopped vehicle is notified of the occurrence of a blind spot region. In this embodiment, in a case in which a moving object such as a bicycle of the like is present in the blind spot region and there is further concern of the moving object darting out from the stopped vehicle, the vehicle 105 is notified of the presence of this moving object. Points different from the first embodiment will be described below in the second embodiment.

Figure 11:
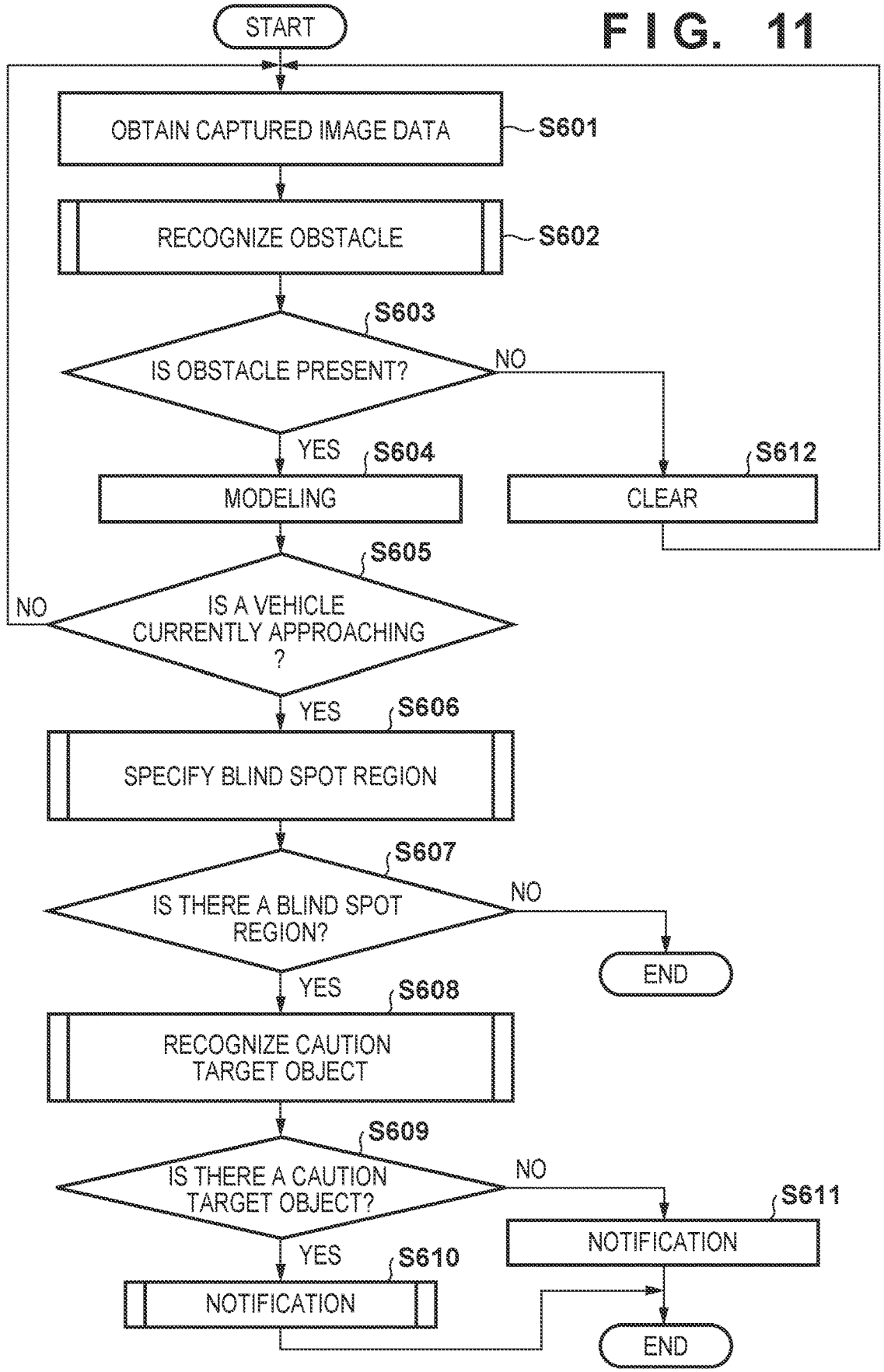
FIG. 11 is a flowchart showing processing executed in the server.

FIG. 11 is a flowchart showing the processing to be executed by a server 101. The processing of FIG. 11 is implemented by, for example, a processor 401 executing a program on a memory 402. Since the processes of steps S601 to S607 and step S612 of FIG. 11 are the similar to those of steps S301 to S307 and step S309 of FIG. 8, a description thereof will be omitted.

If it is determined that a blind spot region has occurred in step S607, the processor 401 causes the image recognition unit 404 to perform, in step S608, caution target object recognition and determine, in step S609, whether a caution target object is present.

Figure 12:
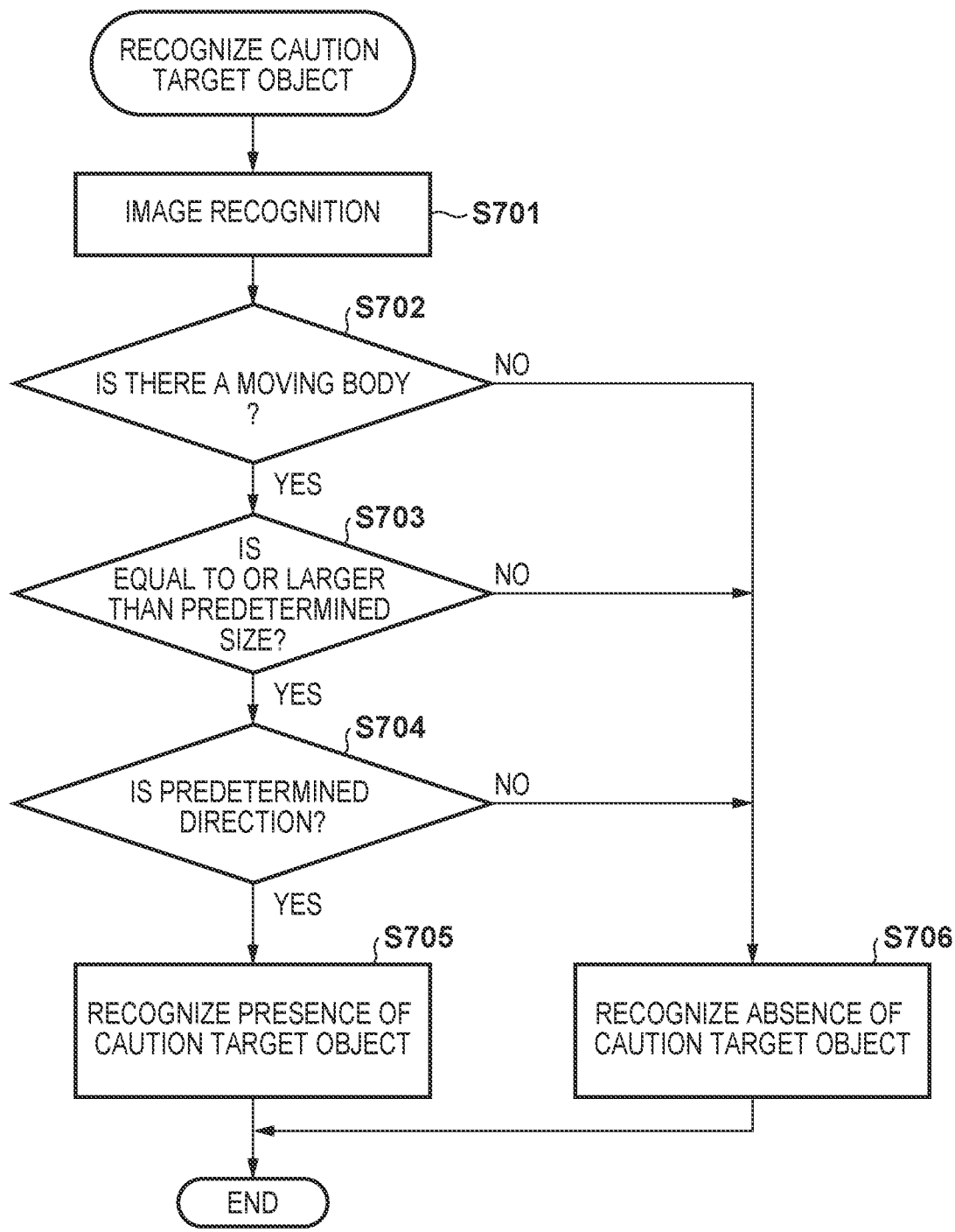
FIG. 12 is a flowchart showing caution target object recognition processing of step S608.

FIG. 12 is a flowchart showing the caution target object recognition processing of step S608. In step S701, the processor 401 determines whether a moving object has been recognized in the captured image data obtained in step S601. If it is determined that a moving object has not been recognized, the processor 401 will recognize that a caution target object is absent and store this recognition result in a storage area such as the memory 402 in step S706. On the other hand, if it is determined that a moving object has been recognized, the process advances to step S703.

In step S703, the processor 401 determines whether the size of the recognized moving object is equal to or larger than a predetermined size. For example, it may be arranged so that whether the size in the height direction of the recognized moving object is equal to or more than a predetermined value. If it is determined that the size of the moving object is not equal to or larger than the predetermined size in step S703, the process advances to step S706. On the other hand, if it is determined that the size is equal to or larger than the predetermined size, the process advances to step S704.

In step S704, the processor 401 determines whether the recognized moving object is moving in a predetermined direction. For example, the processor 401 determines whether the recognized object is moving on a side road 509 in the direction of a stopped vehicle 502. If it is determined in step S704 that the moving object is not moving in the predetermined direction, the process advances to step S706. On the other hand, if it is determined that the moving object is moving in the predetermined direction, the process advances to step S705 and the processor 401 will recognize the presence of a caution target object and store this recognition result in a storage area such as the memory 402 or the like. After the processes of steps S705 and S706, the processing of FIG. 12 ends.

Since a small plastic bag that is being blown by the wind and is moving or a pedestrian moving on the side road 509 in the opposite direction from the stopped vehicle 502 will not be recognized as a caution target object by performing the processing of FIG. 12, it will be possible to recognize a caution target object appropriately.

In step S609 of FIG. 11, the processor 401 determines, based on the result of the caution target object recognition processing performed in step S608, whether a caution target object is present. If it is determined that a caution target object is present, the process advances to step S610. If it is determined that a caution target object is absent, the process advances to step S611. A description of the process of step S611 will be omitted since it is similar to that of the process of step S308 of FIG. 8.

Figure 13:
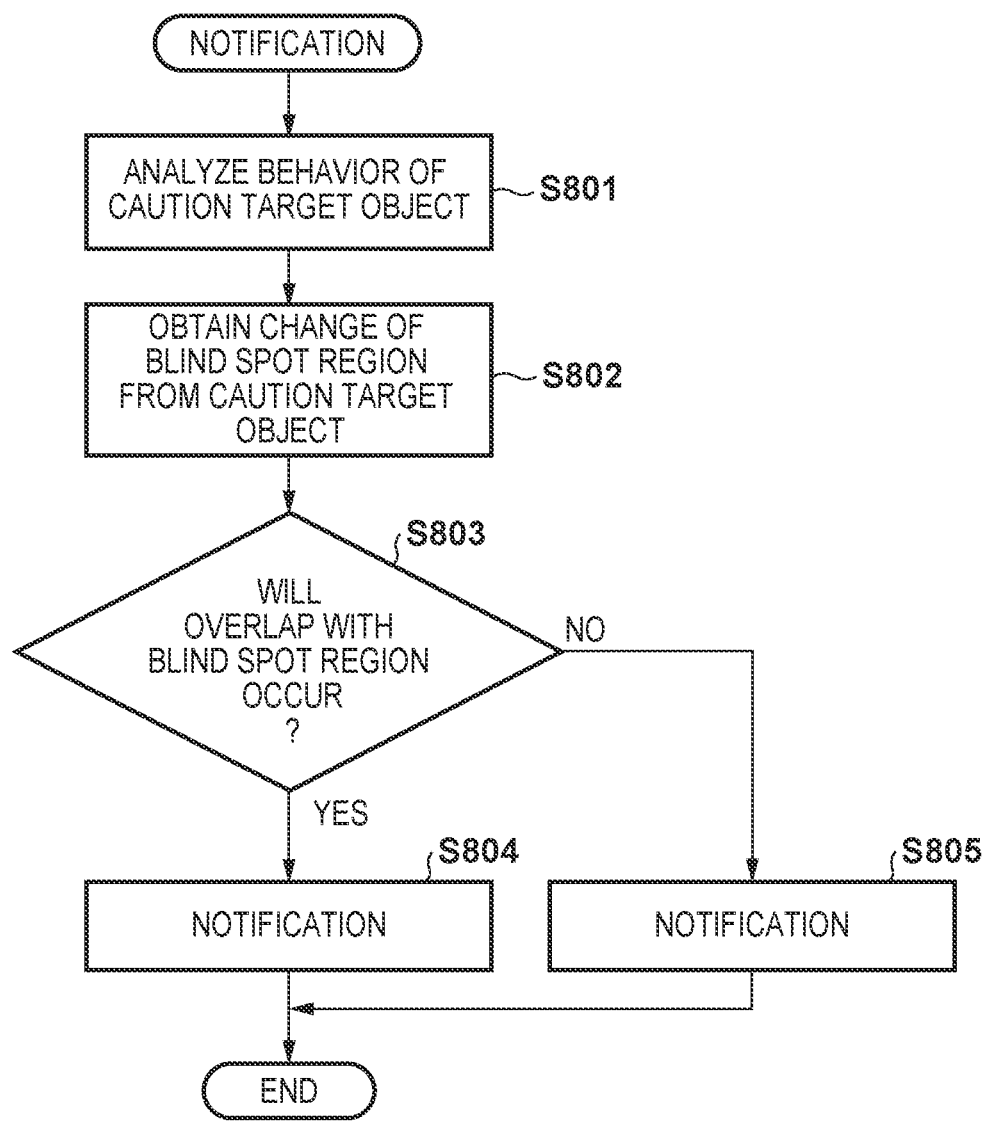
FIG. 13 is a flowchart showing notification processing of step S610.

FIG. 13 is a flowchart showing the notification processing of step S610. In step S801, the processor 401 analyzes the behavior of the recognized caution target object and obtains, in step S802, the change in the blind spot region due to the caution target object.

Figure 14A:
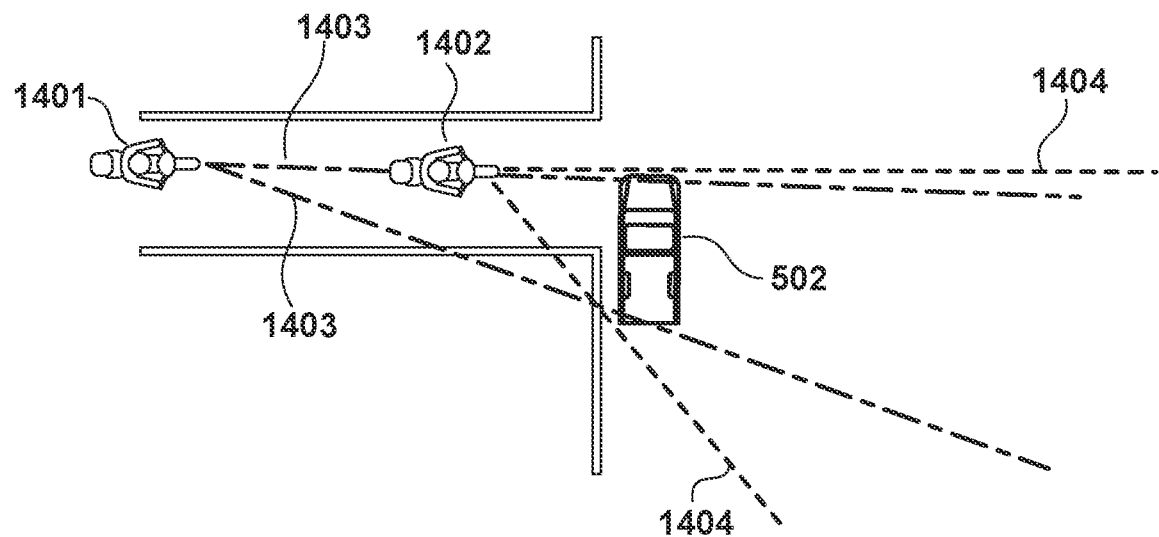
FIGS. 14A and 14B are views for explaining the specification of a blind spot region.

FIG. 14A is a view for explaining the change in the blind spot region due to the caution target object. FIG. 14A shows a state in which a moving object 503, which is a bicycle, is moving from a position 1401 to a position 1402. The processor 401 sets, via a blind spot region specification unit 406, two tangent lines from the center point of the moving object 503 to the simplified model of the stopped vehicle 502 in a manner similar to that described in FIG. 15B. When viewed from the moving object 503, a region which is sandwiched by the two tangent lines and is on the far side of the stopped vehicle 502 is set as the blind spot region. FIG. 14A shows a state in which the blind spot region expands as tangent lines 1403 change into tangent lines 1404 in accordance with the movement of the moving object 503 from the position 1401 to the position 1402. That is, the processor 401 can obtain the change in the blind spot region due to the moving object 503 based on the speed of the moving object 503.

Figure 14B:
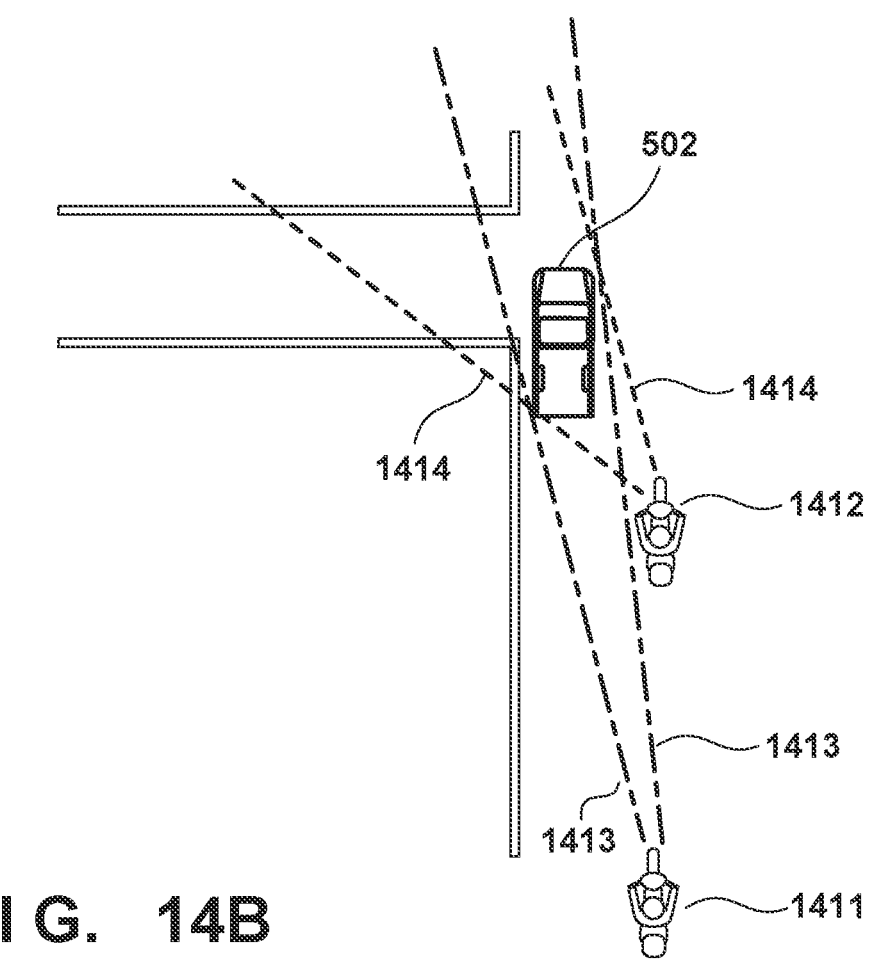

FIG. 14B shows a state in which a vehicle 501 is moving from a position 1411 to a position 1412. The processor 401 sets, via the blind spot region specification unit 406, two tangent lines from the model of the vehicle 501 to the simplified model of the stopped vehicle 502 in the manner described in FIG. 15B. FIG. 14B shows a state in which the blind spot region expands as tangent lines 1413 change into tangent lines 1414 in accordance with the movement of the vehicle 501 from the position 1411 to the position 1412. That is, the processor 401 can obtain the change in the blind spot region due to the vehicle 501 based on the speed of the vehicle 501.

In step S803, the processor 401 determines, based on the change in the blind spot region due to the vehicle 501 caused by the movement of the vehicle 501 in a section 1520 and the change in the blind spot region due to the moving object 503 obtained in step S802, whether an overlap of the blind spot regions will occur. If the vehicle 501 is positioned within the blind spot region from the moving object 503 and the moving object 503 is also positioned within the blind spot region from the vehicle 501, the processor 401 will determine that an overlap of the blind spot regions (mutual blind spot regions) will occur. For example, if the moving object 503 is positioned at the position 1402 when the vehicle 501 is positioned at the position 1412, the moving object 503 will be positioned within the blind spot region from the vehicle 501 and the vehicle 501 will be positioned within the blind spot region from the moving object 503. In such a case, it will be determined that an overlap of the blind spot region will occur. On the other hand, if the moving object 503 is still positioned at the position 1401 when the vehicle 501 is positioned at the position 1412, the moving object 503 will not be positioned within the blind spot region from the vehicle 501 and the vehicle 501 will not be positioned within the blind spot region from the moving object 503. In such a case, it will be determined that an overlap of the blind spot regions will not occur. If it is determined in step S803 that the overlap of the blind spot regions will not occur, the process advances to step S805. A description of the process of step S805 will be omitted since it is similar to that of the process of step S308 of FIG. 8. If it is determined in step S803 that an overlap of the blind spot region will occur, the process advances to step S804.

In step S804, the processor 401 causes a notification control data transmission unit 407 to generate the notification control data for notifying the vehicle 105 of the occurrence of the blind spot region and to transmit the generated notification control data to a portable terminal 106. The notification control data to be generated in this case will be described with reference to FIG. 16B.

Figure 16B:
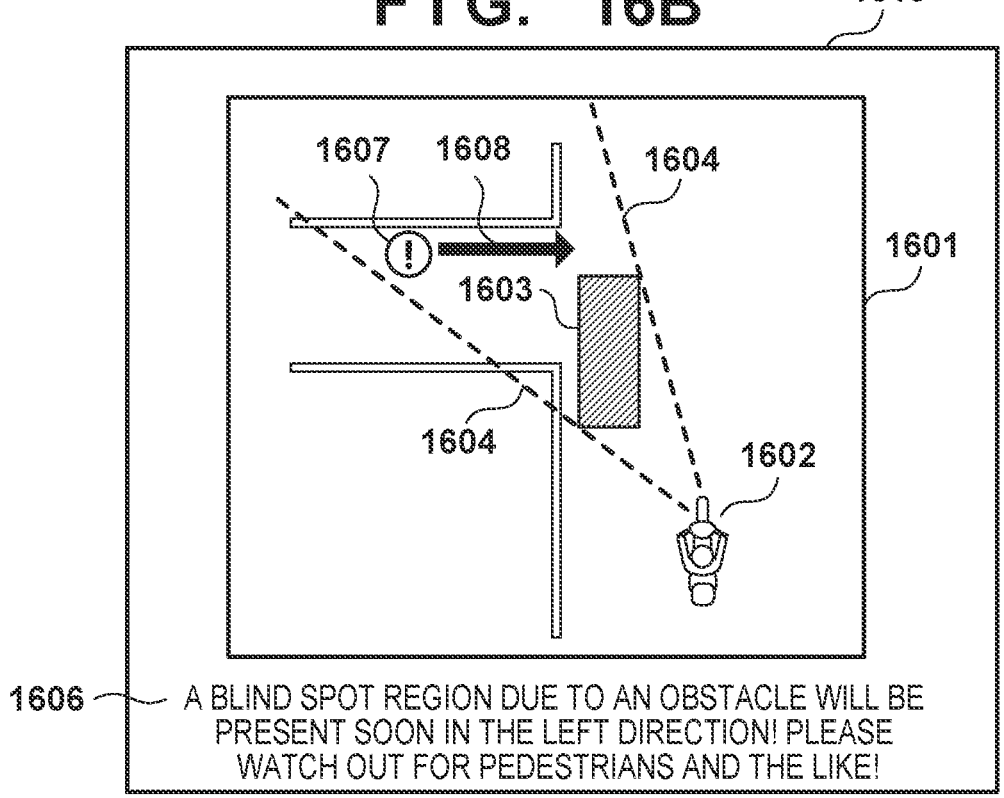

FIG. 16B is a view showing an example of a display screen 1610 which is to be displayed based on the notification control data generated in step S804. The portable terminal 106 can cause a display unit 311 to display the display screen 1610 based on the notification control data received from the server 101.

In the display screen 1610, a display region 1601 is displayed in a similar manner to a display screen 1600. FIG. 16B differs from FIG. 16A in that a caution target object 1607 and a movement direction 1608 of this object are additionally graphically displayed. Furthermore, a message indicating "A blind spot region due to an obstacle will be present soon in the left direction! Please watch out for pedestrians and the like!" is displayed in a display region 1606, and the occupant of the vehicle 105 will be able to recognize the possibility that a pedestrian may dart out or the like. After the processes of steps S804 and S805, the processing of FIG. 13 ends.

As described above, according to this embodiment, in a case in which a blind spot region suddenly occurs due to a stopped vehicle which has temporarily stopped on the side of the road and the presence of a moving object such as a pedestrian or the like is determined in this blind spot region, it is possible to notify the vehicle 105 approaching the vicinity of this blind spot region about the occurrence of the blind spot region and the caution required toward the moving object.

In addition, although this embodiment described an example in which the presence of the caution target object 1607 is displayed on the display screen 1610, it may be set so that the notification of the presence of the caution target object 1607 will be performed by another arrangement. For example, an LED that indicates the presence of the caution target object 1607 may be arranged on a notification unit 215 of the vehicle 105, and the notification of the presence of the caution target object 1607 may be performed by lighting the LED.

Furthermore, it may be arranged so that the occupant of the vehicle 105 can make settings in advance on an application to allow the processing of FIG. 8 and the processing of FIG. 11 to be selectively executed.

Summary of Embodiments

A travel support system according to the above-described embodiment is a travel support system (100) that includes a server configured to support the travel of a vehicle, wherein the server (101) comprises a recognition unit (404, S302) configured to recognize an obstacle (502) on a travel path of the vehicle, an obtainment unit (406, S306) configured to obtain, upon detecting an approaching vehicle (501) which is approaching the obstacle, a blind spot region (510) which occurs due to the obstacle recognized by the recognition unit, and a notification unit (407, S308) configured to notify the approaching vehicle of information of the blind spot region obtained by the obtainment unit, and the server is arranged in an apparatus other than the approaching vehicle.

According to this kind of arrangement, an operation to notify an approaching vehicle of a blind spot region that has occurred due to a temporarily stopped vehicle can be performed without, for example, having to arrange an expensive detection device in each approaching vehicle.

In addition, the recognition unit recognizes the obstacle based on captured image data obtained by an image capturing unit (107, 108, 109) arranged in the apparatus other than the approaching vehicle. Also, the apparatus other than the approaching vehicle is at least one of a building (102), a public facility (103), and a vehicle (104) different from the approaching vehicle.

According to this kind of an arrangement, a temporarily stopped vehicle can be recognized based on captured image data of cameras arranged in, for example, a building, a public facility, and a four-wheeled vehicle.

In addition, in a case in which an object of the captured image data satisfies a first condition, the recognition unit recognizes the object as the obstacle. Furthermore, the first condition is that the size of the object is not less than a threshold.

According to this kind of an arrangement, an obstacle can be recognized appropriately by, for example, recognizing a stopped vehicle whose vehicle height is equal to or higher than a predetermined vehicle height as an obstacle.

In addition, the notification unit notifies the approaching vehicle of the presence/absence of the blind spot region.

According to this kind of an arrangement, it is possible to notify an approaching vehicle of the presence/absence of a blind spot region that has occurred due to a temporarily stopped vehicle.

In addition, in a case in which a moving object that satisfies a second condition is detected in the blind spot region, the notification unit notifies the approaching vehicle of information of the moving object. Furthermore, the second condition is that a mutual blind spot region which occurs due to an obstacle is present between the approaching vehicle and the moving object.

According to this kind of an arrangement, a warning notification operation that a pedestrian as a moving body may dart out can be performed.

In addition, the obtainment unit obtains the blind spot region based on a virtual position of the approaching vehicle.

According to this kind of an arrangement, a blind spot region can be obtained based on, for example, a path to be taken by an approaching vehicle when the approaching vehicle is to pass near an obstacle.

In addition, the travel support system further comprises a generation unit (405, S304) configured to generate a model of the obstacle, and the obtainment unit obtains the blind spot region by using a tangent line set from the virtual position of the approaching vehicle to the model of the obstacle generated by the generation unit. Furthermore, the model of the obstacle is a model obtained by simplifying a contour of the obstacle.

According to this kind of an arrangement, a blind spot region can be obtained based on, for example, the contour of a temporarily stopped vehicle and an approaching vehicle which is present in a virtual position.

In addition, the generation unit is arranged in an apparatus different from the server.

According to this kind of an arrangement, the capacity of data communication between a server and an apparatus different from the server can be reduced.

The invention is not limited to the foregoing embodiments, and various variations/changes are possible within the spirit of the invention.

What is claimed is:

1. A travel support system that includes a server configured to support the travel of a vehicle, wherein the server comprises:
at least one processor circuit with a memory comprising instructions, that when executed by the processor circuit, cause the at least one processor circuit to at least:
recognize a still object on a travel path of the vehicle,
upon detecting an approaching vehicle which is approaching the still object, determine, based on information of the approaching vehicle and information of the still object, whether there exists a blind spot region which occurs due to the still object,
specify a moving object which exists in the blind spot region as a moving object to be notified to the approaching vehicle, based on information of the moving object which exists in the blind spot region, and
notify the approaching vehicle of information of the blind spot region and information of the moving object which exists in the blind spot region, when an existence of the blind spot region has been determined, and
the server is arranged in an apparatus other than the approaching vehicle.

2. The system according to claim 1, wherein the still object is recognized based on captured image data obtained by an image capturing unit arranged in the apparatus other than the approaching vehicle.

3. The system according to claim 2, wherein the apparatus other than the approaching vehicle is at least one of a building, a public facility, and a vehicle different from the approaching vehicle.

4. The system according to claim 2, wherein in a case in which an object of the captured image data satisfies a first condition, the object is recognized as the still object.

5. The system according to claim 4, wherein the first condition is that the size of the object is not less than a threshold.

6. The system according to claim 1, wherein the approaching vehicle is notified of the presence/absence of the blind spot region, as the information of the blind spot region.

7. The system according to claim 1, wherein in a case in which a moving object that satisfies a second condition is detected in the blind spot region, the approaching vehicle is notified of information of the moving object.

8. The system according to claim 7, wherein the second condition is that a mutual blind spot region in which the still object intervenes between the approaching vehicle and the moving object is present.

9. The system according to claim 1, wherein the blind spot region is determined to exist based on a virtual position of the approaching vehicle.

10. The system according to claim 9, wherein the instructions further cause the at least one processor circuit to at least comprising:
generate a model of the still object,
wherein the existence of the blind spot region is determined by using a tangent line set from the virtual position of the approaching vehicle to the model of the still object.

11. The system according to claim 10, wherein the model of the still object is a model obtained by simplifying a contour of the obstacle.

12. The system according to claim 10, wherein the generation of the model of the still object is performed in an apparatus different from the server.

13. A travel support method to be executed in a travel support system that includes a server configured to support the travel of a vehicle, wherein the method comprises causing the server to:
recognize still object on a travel path of the vehicle,
upon detecting an approaching vehicle which is approaching the still object, determine, based on information of the approaching vehicle and information of the still object, whether there exists a blind spot region which occurs due to the recognized still object,
specify a moving object which exists in the blind spot region as a moving object to be notified to the approaching vehicle, based on information of the moving object which exists in the blind spot region,
notify the approaching vehicle of information of the blind spot region and information of the moving object which exists in the blind spot region, when an existence of the blind spot region has been determined, and
the server is arranged in an apparatus other than the approaching vehicle.

14. A non-transitory computer-readable storage medium storing a program for causing a server of a travel support system that supports the travel of a vehicle to:
- recognize still object on a travel path of the vehicle,
- upon detecting an approaching vehicle which is approaching the still object, determine, based on information of the approaching vehicle and information of the still object, whether there exists a blind spot region which occurs due to the recognized still object,
- specify a moving object which exists in the blind spot region as a moving object to be notified to the approaching vehicle, based on information of the moving object which exists in the blind spot region,
- notify the approaching vehicle of information of the obtained blind spot region and information of the moving object which exists in the blind spot region, when an existence of the blind spot region has been determined,
- wherein the server is arranged in an apparatus other than the approaching vehicle in the travel support system.

* * * * *